US011562319B1

(12) United States Patent
Chandiran et al.

(10) Patent No.: US 11,562,319 B1
(45) Date of Patent: Jan. 24, 2023

(54) MACHINE LEARNED ITEM DESTINATION PREDICTION SYSTEM AND ASSOCIATED MACHINE LEARNING TECHNIQUES

(71) Applicant: Amazon Technologies, Inc., Seattle, WA (US)

(72) Inventors: Praveen Ram Chandiran, Bellevue, WA (US); Zachary Ryan Levin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 765 days.

(21) Appl. No.: 16/418,776

(22) Filed: May 21, 2019

(51) Int. Cl.
*G06Q 10/08* (2012.01)
*G06N 20/00* (2019.01)
*G06Q 10/04* (2012.01)

(52) U.S. Cl.
CPC ......... *G06Q 10/0838* (2013.01); *G06N 20/00* (2019.01); *G06Q 10/04* (2013.01)

(58) Field of Classification Search
CPC ..... G06Q 10/0838; G06Q 10/04; G06N 20/00
USPC ........................................................ 705/341
See application file for complete search history.

(56) References Cited

U.S. PATENT DOCUMENTS

| 8,392,116 B2 | 3/2013 | Lehmann et al. | |
| 9,953,332 B2 | 4/2018 | Bateman | |
| 2003/0120505 A1* | 6/2003 | Spiegel | G06Q 10/0838 705/28 |
| 2015/0046365 A1* | 2/2015 | Zamer | G06Q 10/0838 705/341 |
| 2018/0260880 A1* | 9/2018 | Halbrook | G06Q 10/0838 |
| 2018/0365634 A1 | 12/2018 | Clem et al. | |

OTHER PUBLICATIONS

"Package Delivery System Based on Blockchain Infrastructure" Published by IEEE (Year: 2018).*

* cited by examiner

*Primary Examiner* — Zeina Elchanti
(74) *Attorney, Agent, or Firm* — Robert C. Kowert; Kowert, Hood, Munyon, Rankin & Goetzel, P.C.

(57) ABSTRACT

Computer systems and associated methods are disclosed to implement a machine-learned shipping or delivery destination prediction model that can be used to predict shipping or delivery destinations for customer shipping or delivery requests. The prediction model may be trained using a machine learning technique to select, based on customer data, one or more location classes that correspond to different types of location data found in the customer data. Depending on the embodiment, the different types of location data may include a customer's most frequent shipping address, last shipping address, billing address, email address, or others. In embodiments, the prediction model may be used in an item ordering service to auto-populate the shipping or delivery address for a user interface or to provide location-specific shipping options or offers. In embodiments, performance of the prediction model may be determined based on actual customer feedback, and tracked to provide a model performance report.

20 Claims, 12 Drawing Sheets

ITEM SHIPPING INFORMATION *640*

HELLO, *DAVID*:

ITEMS IN ORDER:

ITEM: *650* — *WHOLE MILK*
PREDICTED LOCATION: *652* — *1111 JACKSON ST #234, SEATTLE WA 98144*
LOCATION TYPE: *654* — *DEFAULT ADDRESS*
CONFIDENCE: *656* — *98%*
GET IT BY: *658* — *MAY 1, 2019 (FREE ONE DAY DELIVERY)*

[SELECT NEW LOCATION *659*]

ITEM: *660* — *CHOCOLATES BOX (GIFT)*
PREDICTED LOCATION: *662* — *5555 3RD AVE, SEATTLE WA 98199*
LOCATION TYPE: *664* — *LAST GIFT ADDRESS*
CONFIDENCE: *666* — *77%*
GET IT BY: *668* — *MAY 1, 2019 (FREE ONE DAY DELIVERY)*

[SELECT NEW LOCATION *669*]

TOTAL: $ 19.80

LOCATION-BASED OFFER: *670*

ITEM: *FRESH FLOWERS*
OFFER PRICE: *$ 8.00*
SHIP TO: *5555 3RD AVE, SEATTLE WA 98199*
GET IT BY: *MAY 1, 2019 (FREE ONE DAY DELIVERY)*

[YES, ADD TO ORDER *672*]

[PROCEED TO SHIP *680*]

MACHINE LEARNED ITEM DESTINATION PREDICTION SYSTEM AND ASSOCIATED MACHINE LEARNING TECHNIQUES

BACKGROUND

E-commerce companies often provide shipping services for their customers to ship physical or virtual items to the customers' desired destination locations. For example, an online product vendor may allow its customers to select, purchase, and ship a product from the vendor's website. As another example, a grocery delivery service may allow its customers to deliver groceries to the customers' chosen locations. When a customer requests a delivery or shipment, the customer must manually provide a delivery or shipping address, which can be a slow and tedious step. Although some systems may maintain a known address as a default shipping address for a customer, many customers employ multiple shipping addresses (e.g., a work address and a home address), making the single default address less useful. Furthermore, because the shipping destination is only disclosed to the system at the end of the customer's interactive session, the system cannot use the shipping destination during much of the process to infer useful information about the customer and the order. Better solutions are needed to allow these systems to transparently determine the shipping destination earlier in the session, provide customers useful information based on their intended shipping destinations, and generally provide a more user-friendly ordering experience.

BRIEF DESCRIPTION OF THE DRAWINGS

FIG. 6B illustrates a graphical user interface (GUI) that indicates an auto-populated shipping destination address as determined by a machine-learned shipping destination prediction system, according to some embodiments.

Figure 1:
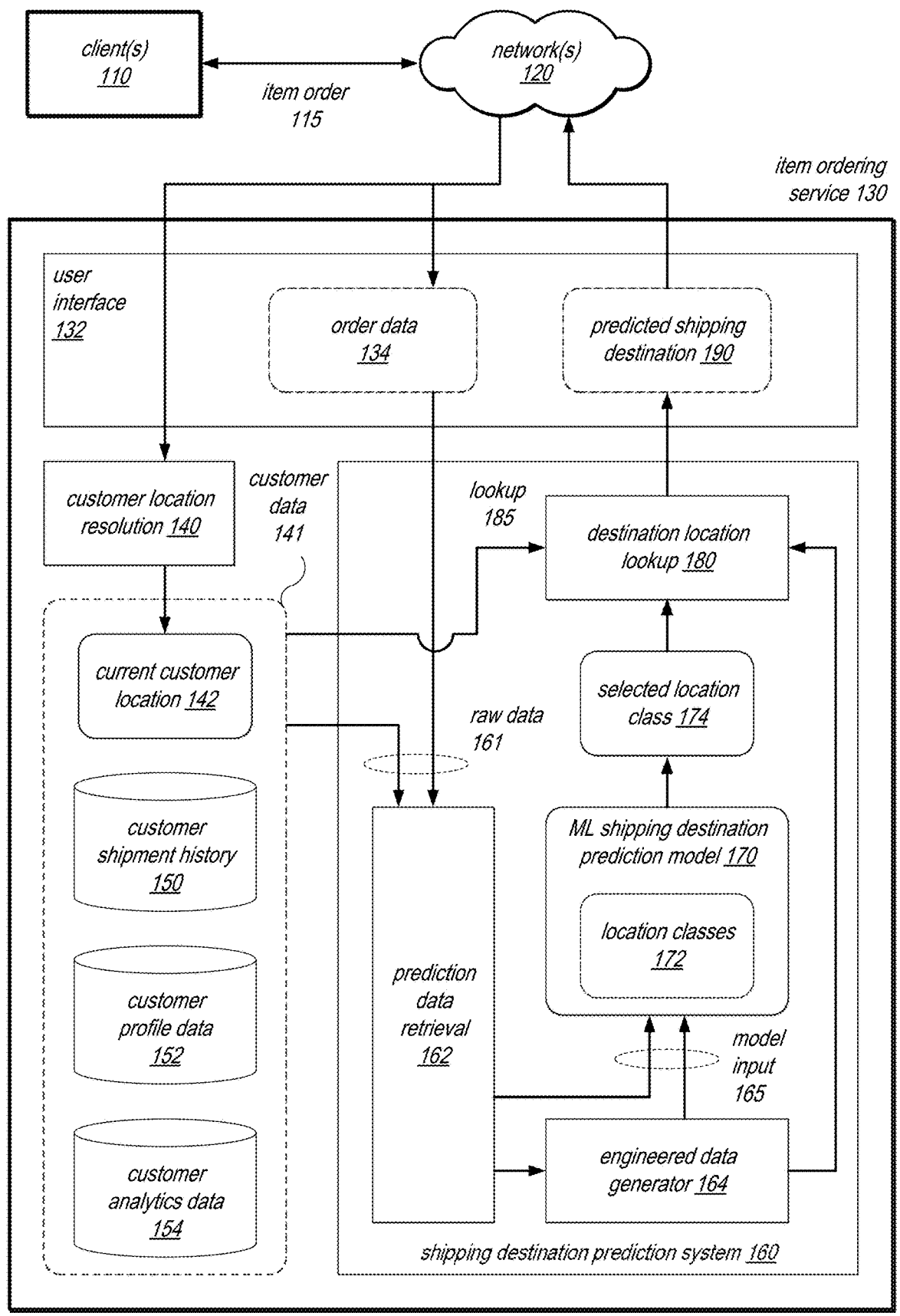
FIG. 1 is a block diagram illustrating an example machine-learned shipping destination prediction system that predicts shipping destinations based on different types of customer data, according some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be used to implement a machine-learned shipping destination prediction system that predicts shipping destinations based on different types customer data.

Some companies may provide shipping services for their customers to ship physical or virtual items to the customers' desired destination locations. For example, such companies may include stores or operators of e-commerce systems that allow customers to purchase or otherwise acquire items for delivery. In some embodiments, an e-commerce system may implement a collection of network-accessible services executed on computer hardware that provide multiple channels (e.g., mobile app., voice-based search, web access, physical presence, etc.) through which customers (using client computing device) can access various catalogs stored in databases to find various products and services available to purchase, lease, etc. In some embodiments, e-commerce systems may provide some or all of its services in the form of detail pages, such as webpages.

When a customer requests a delivery or shipment, the customer must typically provide a delivery or shipping location. Possible delivery or shipping locations may include physical locations such as a work address, a home address, a delivery lock, physical in-store delivery locations, etc. In some embodiments, the delivery or shipping location may also include virtual locations for digital goods, including an email address, a social media account, a telephone number, a network address of a device (e.g. for a computer, a television, or a set of voice-enabled speakers, etc.). In many item ordering or shipping systems, the process of specifying a shipping location can be a slow and tedious step. Although some companies may maintain a known address as the default shipping address for a customer, many customers employ multiple different shipping addresses (e.g., a work address and a home address), making the single default address less useful. Furthermore, because the intended shipping destination is only disclosed to the system at the end of the item ordering process, the system cannot use the shipping destination to infer useful information about the shipping request earlier in the process.

Accordingly, to improve the functioning of computer systems that implement item ordering services that receive and carry out shipping requests for customers, embodiments of a machine-learned (ML) shipping destination prediction system are disclosed to predict the shipping destination for a customer order based on different types of customer data. In some embodiments, the prediction of shipping destinations may be performed with customer consent, for example, by opting in to a shipping destination prediction feature provided by the system. In some embodiments, the ML shipping destination prediction system may use customer data such as a customer's shipment history, profile data, or analytics data to select one type of location data associated with the customer as the shipping destination. In some embodiments, this customer data is collected and used only with customer permission. In some embodiments, the prediction system may be hosted in a larger machine learning service, which may be configured to host and execute machine learning applications. In some embodiments, the machine learning service may be provided by a cloud-based service provider using computing infrastructure operated by the cloud-based service provider.

In some embodiments, the ML shipping destination prediction system may make its predictions using a machine-learned prediction model. In this context, the prediction model may implement a machine-executable function that can be invoked by a computer system to programmatically predict the shipping destination for a particular order of one or more items. The prediction model may include a number of model parameters that are adjusted during a training phase of the model using a machine learning technique, using one or more training datasets. The result of such training yields a set of model parameters that are tuned to perform the modeled task, in this case, the prediction of shipping destinations.

Depending on the embodiment, the prediction model may be represented in a variety of ways. For example, in some embodiments, the model may be stored as a data structure that can be easily used by a computer to generate prediction output. For example, in some cases, the model may be represented as a vector or a matrix of parameter values used to perform a computation. The parameter values may be values that are used in the prediction process itself, or other metadata used for other purposes. For example, in some cases the prediction model parameters may include one or more values indicating a current confidence level or bound of the model. In some cases, a model may include memory units that store the ongoing state of the modeled subject or values derived from past inputs or outputs. In some cases, prediction models may be stored as more complex data structures that specify relationships between the different decision units, such as trees, graphs, neural networks, or the like. In some cases, a model may include a combination of different types of these data structures. In some cases, the parameters or structure of these models may be dynamically changed in the production environment, based on an ongoing evaluation of the model's performance. In some embodiments, a model may be embedded as part of a computer-executable program or a set of hardware circuits, which may expose configurable model parameters, and be executed to carry out the prediction functions of the shipping destination prediction system.

In some embodiments, the shipping destination prediction model may be trained using a machine learning technique to classify a shipping request (or an order being constructed) to a location class, which represents the predicted destination location. In some embodiments, the set of possible location classes may correspond to different types of location data in the customer data. For example, different location classes may indicate a customer's specified default address, a billing address, a home address, a work address, or some other type of address that may be used as the shipping destination. In some embodiments, additional location classes may be assigned for types of engineered location data that are computed for the prediction model. For example, in some embodiments, location classes may be used to represent computed locations such as the last shipping address of a customer, the most frequent shipping address of a customer, or a last billing address of a customer, etc. Accordingly, the shipping destination prediction model may be trained to select a location class that is most likely to be the shipping destination under a particular set of circumstances, based on the customer's existing data, and the selected location class may then be used to lookup the predicted shipping destination in the customer data.

Advantageously, the shipping destination prediction model may make its predictions based on many types of input data. In some embodiments, the input data may include the data of the order, including the one or more items to be shipped, the various features of the items, or the shipment or delivery time specified by the request. In some embodiments, the model's input data may include, with the customer's permission, the customer's various features, traits, or stated preferences. In some embodiments, the model's input data may include data from the customer's past shipment history, including the past destination locations, shipped items, shipment times, or other data indicated in the customer's past shipping records. In some embodiments, the model's input data may include, with the customer's permission, a detected current location of the customer as the customer is composing the order or the shipping request. In some embodiments, such current location information may be obtained using a client device's internet protocol (IP) address or using the client device's global position system (GPS) data. In some embodiments, the input data may include the output of other rule-based systems or machine-learned systems.

In some embodiments, the shipping destination prediction system may make shipping destination predictions multiple times during a customer session to construct an order. For example, the shipping destination prediction system may be invoked when additional input information becomes available during the session, such as when the customer selects various items, provides a form of payment, etc. In some embodiments, a session may correspond to a detectable sequence of interactions between the customer and the item ordering service, such as a sequence of interactions during a logon session of the customer. In some embodiments, a session may be defined or detected in other ways. For example, in some embodiments, a server (e.g. a web server of the item ordering service) may store an indicator (e.g. a cookie) on a customer's computer, with the customer's permission, and subsequent interactions from the customer's computer may be treated as a single "session" by the item ordering service's servers. Accordingly, the item ordering service may use the predicted shipping destination early in the ordering process or session to infer or determine information about an order being constructed. For example, in some embodiments, the shipping service may use the prediction shipping destination to determine or recommend one or more shipping options for the shipment request, or one or more location-specific offers or recommendations to the customer. In some embodiments, the predicted shipping destination may be displayed on a GUI of the item ordering service, so that the customer can correct the prediction if it is incorrect. In some embodiments, the GUI of the item ordering service may use the predicted shipping destination to auto-populate a form (e.g. a shipping form) during the ordering process.

To train the shipping destination prediction model, a training and test dataset may be obtained from the item ordering service's existing data. In some embodiments, past shipping records for the customers may be used as individual observation records. The past shipping records may be filtered or augmented, and additional attributes (e.g., one or more types of engineered data engineered for the model) may be generated and added to the observation records. Additionally, the observation records may be labeled using a set of location class labels, which correspond to a desired set of location types found in the customer data or the engineered data. The model is then trained to select the correct location class table for the given observation record. Thus, the location class labels are used to represent truth labels for the observation records.

In some embodiments, this labeled set of shipping records may be separated into one or more training datasets and test or validation datasets. The prediction model may be trained (e.g. tuned) using the training dataset, and then tested (e.g. without changing the model parameters) using the test dataset. In some embodiment, the training process may involve additional rounds and/or additional datasets to tune the model's hyperparameters, depending on the type of model. Depending on the embodiment, different types of ML models may be used as the prediction model, including linear models such as logistic regression models, tree-based models such as extra tree classifiers or random forest models, or other types of models such as neural networks, and the like. In some embodiments, the prediction model may include a combination of multiple ML models, or an ensemble of different types of ML models. In some embodiments, the test dataset may then be used to evaluate the model's performance with respect to the test dataset. In some embodiments, when the model is determined to satisfy performance criterion during a test phase, the training of the model may be stopped.

As may be understood, the disclosed systems and methods improve the functioning of conventional computer systems and services that implement computerized shipping or delivery services to provide an accurate shipping destination prediction feature to predict a shipping destination for a customer based on different types of location data found in the customer's data. As one skilled in the art will appreciate in light of this disclosure, certain embodiments are capable of achieving certain advantages, including some or all of the following.

In some embodiments, the shipping destination prediction feature allows the shipping service to transparently and accurately predict a shipping destination for an item order being constructed, which may be used to improve the user experience during the order construction process. For example, the predicated shipping destination may be used to auto-populate certain information during the ordering process, such as the destination itself, or shipping options or offers that are dependent on the shipping destination. In one respect, the automation simplifies the ordering process and relieves the user from having to manually supply the shipping address or select a shipping option, and improves the user interface of the item ordering service.

Additionally, the prediction model allows the ordering system to obtain a shipping destination early in the customer session, possibly before an order is even initiated. The item ordering service may then use the predicted shipping destination to make a variety of decisions earlier in the session, such as determining appropriate shipping options, selecting shipping sources (e.g. warehouses) or shipping routes, or determining one or more location-specific offers specific to the order, etc. In some embodiments, the prediction system may be configured to monitor a customer's session and/or construction of an order, and repeated adjust the predicted shipping destination in real time based on additional information about the order. For example, the item ordering service may use the prediction model to update the predicted shipping destination as soon as the customer indicates that an item to be ordered is a gift item.

Item ordering services may store different types of data about customers, with the customers' permission. Such customer data may include the customer's past shipping history, the customer's profile data, and analytics data about the customer that are determined for the customer for a variety of purposes. In many cases, the many types of customer data include data that may be predictive of the likely shipping destination of a new order from the customer. However, traditional rule-based or programmed systems are generally not able to take full advantage of such customer data. For example, the customer data may include subtle patterns that are difficult to detect. In some cases, detected patterns in the data may be difficult to formulate as rules. Such problems can be overcome with a machine learned model, which can be trained to detect hidden patterns in the large body of customer data and without the need to express its logic in terms of formal rules. It is recognized that because the correct shipping destination for most customer orders is likely to be a type of location in the customer data, the problem of predicting a shipping destination can be posed as classification problem to classify shipping requests to different types of locations in the customer data. By using a machine learned model to predict the shipping destination in this fashion, the correct shipping destination can be predicted with high accuracy.

Unlike traditional programmed solutions, the machine learning approach can be easily used to create a large number of customized destination prediction models that are trained to operate under different circumstances. For example, one prediction model may be trained for customers in one country or region, and another prediction model may be trained for customers in a different country or region. As another example, different models may be trained for different time periods, such as different months of the year. Such customizations are not easily accomplished in programmed systems.

Furthermore, unlike traditional programmed solutions, the machine learned model in this case can be easily modified over time with further training, for example, to adapt to the changing nature of the customer data. In some embodiments, the machine learned model can be easily modified to include additional input signals or generate additional output location classes. Such changes are difficult to achieve in traditional programmed systems, which are difficult to formally verify, and where any minor change to the program code can undermine the correctness or accuracy of the entire system. In some embodiments, the shipping location prediction system can be configured to automatically make adjustments to the prediction model, based on a monitoring of the model's ongoing performance. These and other features and benefits of the inventive system and method are described in more detail below, in connections with the figures.

FIG. 1 is a block diagram illustrating an example machine-learned shipping destination prediction system that predicts shipping destinations based on different types of customer data, according some embodiments.

As shown, the figure depicts a client 110 that can communicate over one or more networks 120 to submit item orders 115 to an item ordering service 130. The client(s) 110 may encompass any type of client configurable to submit requests to the item ordering service 130. For example, a given client 110 may include a suitable version of a web browser or may include a plug-in module or other type of code module configured to execute as an extension to or within an execution environment provided by a web browser. Alternatively, a client 110 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data.

In various embodiments, the network(s) 120 may encompass any suitable combination of networking hardware and protocols necessary to establish network-based communications between clients 110 and item ordering service 130. For example, a network 120 may generally encompass the various telecommunications networks and service providers that collectively implement the Internet. A network 120 may also include private networks such as local area networks (LANs) or wide area networks (WANs) as well as public or private wireless networks. For example, both a client 110 and the item ordering service 130 may be respectively provisioned within enterprises having their own internal networks. In such embodiments, the network 120 may include the hardware (e.g., modems, routers, switches, load balancers, proxy servers, etc.) and software (e.g., protocol stacks, accounting software, firewall/security software, etc.) necessary to establish a networking link between the client 110 and the Internet as well as between the Internet and item ordering service 130. In some embodiments, client(s) 110 may communicate with item ordering service 130 using a private network rather than the public Internet.

In various embodiments, the item ordering service 130 may encompass any suitable computer-implemented service that allows clients to order items to be shipped. For example, in some embodiments, the item ordering service 130 may be implemented by one or more web servers of a product vendor, which may allow customers to order products from a website implemented by the web servers, and deliver the products to the customers' specified locations. As another example, the item ordering service 130 may be a grocery delivery service, which allows customers to specify where to deliver groceries purchased by a customer. As another example, item ordering service may be a shipping or delivery service, where customers may specify orders 115 instructing the service to ship items to different locations.

As shown, the item ordering service 130 may implement a user interface 132, which may be a graphical user interface (GUI). In some embodiments, the user interface 132 may be implemented as a web interface (e.g., where the displayed content and/or user controls are provided via a web browser). As shown, the client 110 may interact with the user interface 132 to construct an order, which has associated order data 134. In some embodiments, the client may log on to the service 130, and initiate a client session. In some embodiments, a client session may be initiated by other events prior to any client logons. For example, in some embodiments, session state information may be maintained over multiple logons, or stored on the client system and persistent over a long period of time. In some embodiments, the client 110 may construct an order of one or more items to be shipped during the session. For example, in some embodiments, the client may navigate to a website, browse a product listing provided via the website, select one or more items to order, and then go through a checkout process to purchase and ship the ordered items. During this process, the order data 134 may be accumulated as the customer proceeds through various user interfaces of the website. For example, in some embodiments, the order data 134 may first be updated with the customer's identity (e.g. when the customer logs in), updated again when the customer adds items to his or her online shopping cart, and updated again when the customer provides his or her payment information. As shown, such order data 134 may be used as model input data to predict a shipping destination for the order, before the shipping destination is actually provided by the customer.

As shown, in some embodiments, the item ordering service 130 may implement a number of different types of customer data 141. As shown, the customer data 141 may include stored data, such as the customers' shipment history 150, the customers' profile data 152, and the customers' analytics data 154. In some embodiments, the storing and use of such data may be performed according to the customer's permission. In some embodiments, such data may be stored in different data stores, databases, possibly in different database management systems or geographic locations. In some embodiments, at least some of this data may be stored in a common data repository or data warehouse, which may organize the customer information into different tables or datasets. In some embodiments, these data stores or database systems may provide query interfaces to allow other computer systems to obtain data therefrom using queries, for example, to obtain the customer data for a particular customer. As shown, depending on the embodiment, different elements the customer data 141 may be supplied to the shipping destination prediction system 160, to be used to generate a shipping destination prediction for the order.

In some embodiments, the customer shipment history 150 may include past shipment records for the customers of the item ordering service 130. In some embodiments, each shipment record may indicate an order that was actually shipped. In some embodiments, orders that were not shipped are not used to make the destination prediction, because such order records are less trustworthy source for the ultimate shipping destination. In some embodiments, each shipping record may also indicate other relevant features of the shipment for predicting the shipping destination, such as the identifiers (e.g. product IDs) of the items shipped, any gift indicators, the time or the order or the delivery time, the shipment source location, the shipping route taken, among other things.

In some embodiments, the customer profile data 152 may include respective profile information for each customer. In some embodiments, such profile information may be provided by the customer himself or herself. In some embodiments, the profile information may be visible and modifiable by the customer. In some embodiments, the profile data 152 may include the customer's name and various demographic information about the customer. In some embodiments, the profile data 152 may include an address book of the customer, which may include the (present or past) addresses associated with the customer, such as residence addresses, work addresses, or billing addresses, etc. In some embodiments, the customer profile may indicate that a customer is a business entity or an item seller, and indicate multiple office location addresses or frequent shipping addresses of related businesses. In some embodiments, the profile data 152 may include saved information for payment instruments (e.g. credit cards or bank account information), which may be associated with other addresses. In some embodiments, the profile data 152 may indicate a social network of the customer, which may link the customer to other customers of the item ordering service 130. For example, customers may link other customers who are their family members, friends, or co-workers, etc.

In some embodiments, the customer analytics data 154 may include data that is computed by the item ordering service 130 for individual customers. Such analytics information may include, for example, different types of customer segments that each customer is assigned to, which may be determined based on the customer's interactions with the item ordering service 130. For example, a customer may be assigned to a "high volume" customer segment if the customer's order frequency exceeds a certain level. As another example, a customer may be assigned to an interest-related segment for baby products or pet products based on the customer's past browsing or purchasing history. In some embodiments, such analytics data 154 may be used by the item ordering service to make promotions to the customers, and not be directly visible or modifiable by the customers. In some embodiments, the customer analytics data 154 may be generated based on other rule-based systems or machine learned systems used by the item ordering service 130.

As shown, in this example, the customer data 141 also includes the current location 142 of a customer that is constructing the order data 134, which may be automatically obtained with the customer's permission. In some embodiments, this location information may be obtained via a customer location resolution module 140, which may be implemented as part of the item ordering service. In some embodiments, the customer location resolution module may use certain information about the current session of the customer to determine the current location of the customer. For example, in some embodiments, the internet protocol (IP) address of the client 110 used by the customer may be resolved to determine a pre-registered location of the customer. For example, the IP address may be a static address that is registered to a known location, which may be obtained from the registry (possibly implemented as a third-party service). As another example, in some embodiments, the client device 110 may be a mobile device that includes global position system (GPS) capabilities, which may be accessed by the item ordering service 130 to determine the current GPS location of the customer. Depending on the embodiments, other methods of location determination may also be used. For example, in some embodiments, the location may be determined based on a cookie deposited at the client device, which identifies the client device associated with a known location. In some embodiments, the location of a mobile client device may be determined based on the network access point that the device is communicating with. In some embodiments, client's location may be determined directly from the customer, for example, via a question posed to the customer at the time of logon. In some embodiments, a combination of different methods may be used to determine the current location 142 of the customer.

As shown, to make the shipping destination prediction 190, the item ordering service in this example implements a shipping destination prediction system 160, which employs a ML shipping destination prediction model 170. In some embodiments, the ML prediction model 130 may be trained to classify different orders into one or more of a set of location classes 172. In some embodiments, the location classes 172 may correspond to different types of location data found in the customer data 141. In some embodiments, the different location classes 172 may represent different data fields in the customer data 141, such as for example a default address specified for a customer, a billing address for the customer, or a home or work address for the customer. In some embodiments, as shown, the customer data 141 may include the shipment history 150 for a customer, which may include other types of addresses (e.g. past shipment destination addresses). In some embodiments, some of the location classes 172 may refer to types of engineered location data, for example, the last destination address in the shipping records for a customer, or the most frequent shipping address in a set of most recent shipping records, or a last billing address used by the customer, etc. As shown, the ML shipping destination prediction model is trained to select a location class 174 from the set of location classes 172, from its model input data 165, that corresponds to the predicted shipping destination.

As discussed, the shipping destination prediction model 170 may be implemented as a variety of different types of machine learning models, depending on the embodiment. In some embodiments, the model 170 may be implemented using a tree-based model, such as random forest model. In a random forest classification model, a number of decision trees are constructed at training time, and the mode of the output classes from the decisions trees is outputted as the predicted class of the forest. In some embodiments, a random decision forest corrects for the tendency of individual decision trees to overfit to their training datasets. In some embodiments, an extra tree (or "extreme randomized" tree) classification model may be used as the prediction model 170. Similar to the random forest model, an extra tree classifier may implement a meta-estimator that fits a number of randomized decision trees on different sub-samples of the training dataset and uses a form of averaging to improve the predictive accuracy and control over-fitting. However, unlike the random forest model, the extra tree model will randomly select split values at the tree nodes during training, whereas the random forest model will generally compute a locally optimal feature/split combination at a node. In some cases, this variation of extra tree models leads to a set of more diversified trees. In some embodiments, other types of ML models may be used as the prediction model 170, such as for example, linear classifiers such as logistic regression, other types of decision tree models, support vector machines, neural networks, and others. In some embodiments, multiple different types of ML models may be ensembled to implement the prediction model 170.

As shown, the input 165 to the model 170 is constructed through a series of steps, in this example. First, raw data 161 is obtained via a prediction data retrieval system or component 162. As shown, the retrieval component 162 may collect needed raw data from all of the different types of customer data 141, as well as the order data 134 that is being constructed by the customer. In some embodiments, the raw data may be received via one or more programmatic interfaces or application programming interfaces (API) that interface with other programmatic components. In some embodiments, the shipping destination prediction system 160 may implement an invocation interface, which receives prediction requests from other components of the item ordering service, and return a prediction result from that interface. In some embodiments, a triggering request may come from the item ordering service, which may provide the current state of the order data 134. In some embodiments, once the prediction request is received, the retrieval component 162 may make one or more queries or API calls to retrieve the various types of customer data 141. In some embodiments, the customer data returned from such queries may be cached by the shipping destination prediction system 160, for example, during the customer ordering session. In this manner, the system may be used to make repeated predictions more quickly during the customer session.

As shown, in some embodiments, an additional step may be employed to generated one or more types of engineered data used by the prediction model, for example, via an engineered data generator 164. In some embodiments, both the raw data 161 and the engineered data generated may be combined to form the model input data 165. In some embodiments, the engineered data may include for example, summary data or metrics about the customer or the customer's past shipments. For example, the engineered data may include the top three most frequent shipping destinations for the customer in the past year, or in the past 20 shipments. As another example, the engineered data may include Boolean indicators that indicate answers to particular questions about the customer data, such as whether last six shipments always used the same shipping destination, whether the customer only purchased household items in the past year, whether the customer's billing address is the same as the customer's most frequent shipping destination address, etc. In some embodiments, such engineered data may be employed by the model's designers to improve the prediction model's accuracy and/or reduce the model's complexity. In some embodiments, the engineered data is computed specifically for the model, and maintained (or cached) only by the shipping destination prediction system 160.

As shown, once a location class 174 is selected by the prediction model 170, the selection is provided to a destination location lookup component or module 180. In some embodiments, given a selected location class 174, the lookup module 180 can perform a lookup operation 185 to obtain the actual location data (e.g., a destination address) indicated by the location class. As shown, because the location class 174 can refer to location types in both the customer data 141 and the engineered data produced by the engineered data generator 164, the lookup module 180 may be configured to interact with both components to implement the lookup 185. In some embodiments, where the predicted location class 174 will only refer to the customer data 141, the lookup operation 185 may be implemented outside of the shipping destination prediction system 160. In such an embodiment, the shipping destination prediction system 160 may simply produce the selected location class 174 from its output interface, and another component in the item ordering service can perform the lookup operation using the selected location class.

As shown, in this example, once the predicted destination shipping address 190 is provided by the shipping destination prediction system 160, it may be used by the item ordering service 130 to make a number of decisions or perform a number of actions, including displaying the predicted shipping destination in the service's user interface 132. As discussed, in some embodiments, the predicted shipping destination 190 may be used to auto-populate a form, for example, to specify how to ship the items ordered. In some embodiments, the predicted shipping destination may be displayed to the customer earlier in the ordering session, so that the customer can change the destination if the prediction is incorrect. In some embodiments, the item ordering service 130 may select one or more shipping options (indicating e.g. a shipping service provider, a shipping price, or a shipping time estimate) for the order, based on the predicted shipping destination 190. In some embodiments, the service 130 may select one or more location-specific offers based on the predicted destination (e.g., for an order of groceries, there are other types of fresh groceries close to the predicted destination). In some embodiments, the service 130 may use the predicted destination 190 to make logistical decisions such as selecting a closest shipping source location (e.g. a warehouse close to the destination), selecting an earliest shipment, or performing certain logistic checks (e.g. checks for inventory checks, etc.). All of these actions and decisions may be made early in the ordering session, using the shipping destination prediction system 160. Additionally, all of these decisions may be adjusted in real time as the ordering information changes, by making repeated prediction requests to the prediction system.

As may be appreciated by those skilled in the art, in some embodiments, the destinations selected by the prediction model may include virtual locations for digital goods, instead of physical shipping locations. In some embodiments, these types of virtual locations may be specified by other types of addresses such as email addresses, social media account IDs, telephone numbers, network addresses of devices (e.g. a smart TV or computer, etc.). The destination prediction system as discussed herein may be used to select from these types of virtual locations as delivery destinations, without departing from the spirit of these disclosures.

Figure 2A:
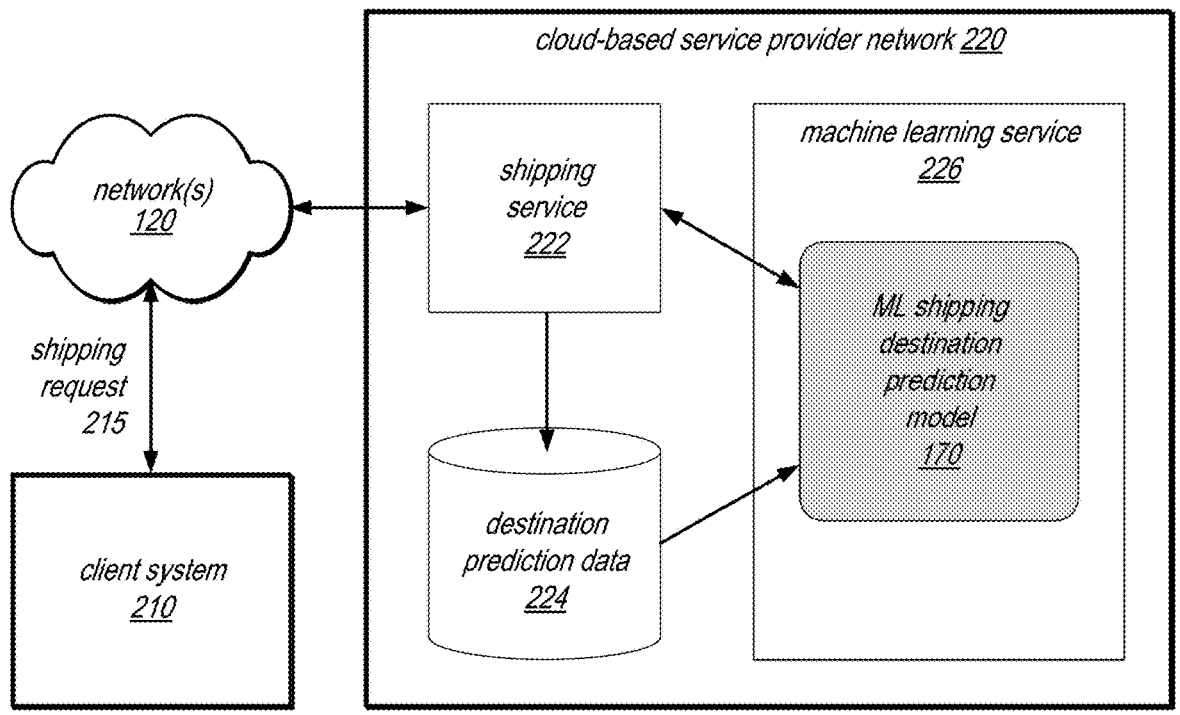
FIGS. 2A and 2B illustrate two embodiments of machine-learned shipping destination prediction systems, in server system and a client system, respectively.
Figure 2B:
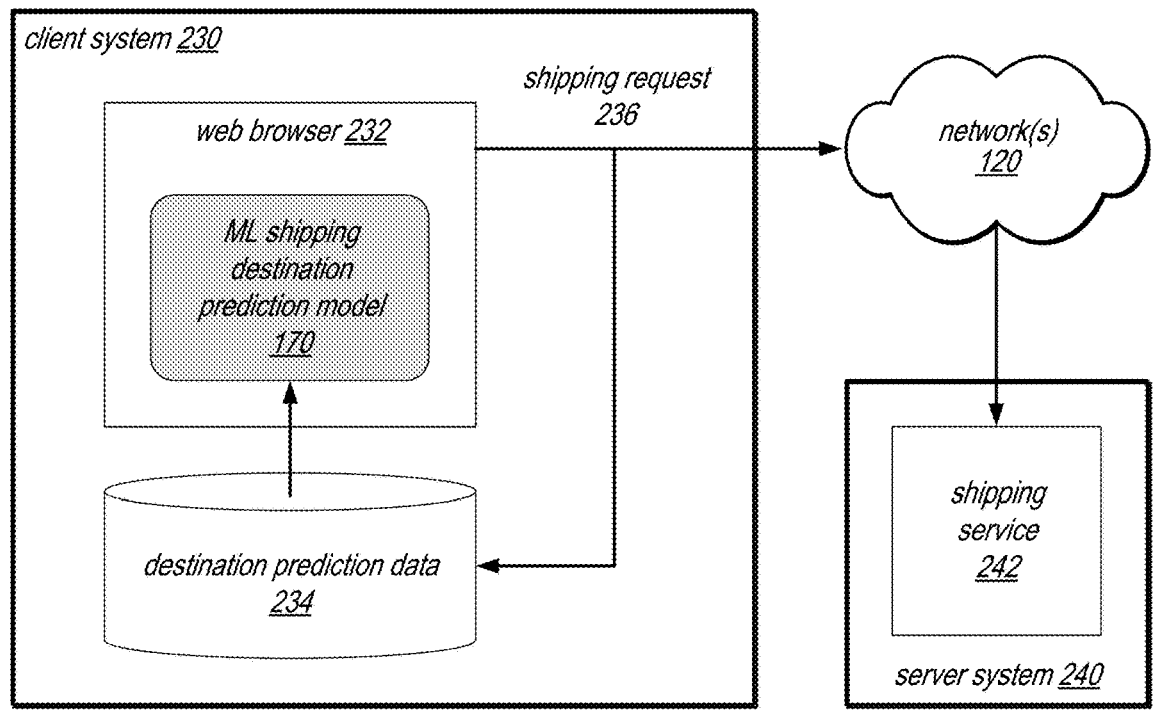

FIGS. 2A and 2B illustrate two embodiments of machine-learned shipping destination prediction systems, in server system and a client system, respectively.

In FIG. 2A, as shown, the ML shipping destination prediction model is implemented on the server side. In this example, the server system implements a cloud-based service provider network 220. The cloud-based service provider network 220 may interact with a client system 210, over the network(s) 120 as discussed in connection with FIG. 1. In some embodiments, the service provider network 120 may provide computing resources via one or more computing services to the client(s) 210. The service provider network 220 may be operated by an entity to provide one or more services, such as various types of cloud-based computing or storage services, accessible via the Internet and/or other networks to client(s) 210. In some embodiments, the service provider network 220 may include numerous data centers hosting various resource pools, such as collections of physical and/or virtualized computer servers, storage devices, networking equipment and the like, needed to implement and distribute the infrastructure and services offered by the service provider network 220. In some embodiments, service provider network 220 may provide computing resources to clients. These computing resources may in some embodiments be offered to client(s) 220 in units called "instances," such as virtual compute instances.

As shown, in some embodiments, the service provider network 220 may host a plurality of different services for the client(s) 210. In this example, as shown, the service provider network 220 may implement two services, a shipping service 222 and a machine learning service 226, which may be used to host the prediction model 170. Accordingly, the client system 210 may issue shipping requests 215 to the shipping service 222. In some embodiments, the shipping service 222 may be (or be a part of) the item ordering service 130 of FIG. 1.

In some embodiments, the machine learning service 226 (MLS) may implement a set of programmatic interfaces that can be used by client(s) (e.g. the shipping service 222) to submit requests for a variety of machine learning tasks or operations. The machine learning service 226 may include a control plane that comprises a plurality of components (including a request handler, workload distribution strategy selectors, one or more job schedulers, metrics collectors, and modules that act as interfaces with other services). The data plane of the MLS may include, for example, a resource pool, storage devices that are used to store input data sets, intermediate results or final results (some of which may be part of the MLS artifact repository), and the network pathways used for transferring client input data and results.

In some embodiments, a job submitted to the MLS 226 may indicate one or more operations that are to be performed as a result of the invocation of a programmatic interface, and the scheduling of a given job may in some cases depend upon the successful completion of at least a subset of the operations of an earlier-generated job. In at least some implementations, the MLS job queue may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS client). After the processing plan has been generated and the appropriate set of resources to be utilized for the job has been identified, the job's operations may be scheduled on the resources. Results of some jobs may be stored as MLS artifacts within a results repository in some embodiments.

In some embodiments, client requests may result in the immediate generation, retrieval, storage, or modification of corresponding artifacts within MLS artifact repository by the MLS request handler. A client request may also indicate one or more parameters that may be used by the MLS to perform the operations, such as a data source definition (e.g. for the destination prediction data 224), a feature processing transformation recipe, or parameters to be used for a particular machine learning algorithm. In some embodiments, artifacts respectively representing the parameters may also be stored in MLS repository. Some machine learning workflows, which may correspond to a sequence of API requests from a client, may include the extraction and cleansing of input data records from raw data repositories (e.g., repositories indicated in data source definitions) by input record handlers of the MLS.

The output produced by the input record handlers may be fed to one or more feature processors, where a set of transformation operations may be performed in accordance with recipes using another set of resources from the resource pool. The output of the feature processing transformations may in turn be used as input for a selected machine learning algorithm, which may be executed in accordance with algorithm parameters using yet another set of resources from the resource pool. A wide variety of machine learning algorithms may be supported natively by the MLS libraries, including for example random forest algorithms, neural network algorithms, stochastic gradient descent algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS.

As shown, in the depicted example, the machine learning service 226 is used to host the ML shipping destination prediction model 170, which uses the destination prediction data 224. In some embodiments, the destination prediction data 224 may store some or all of the customer data 141, as discussed in connection with FIG. 1. In some embodiments, the destination prediction data 224 may be updated by the shipping service 222. In some embodiments, the machine learning service 226 may execution the prediction model 170 on an ongoing basis, to continually make shipping destination predictions for the shipping service 222, as shown.

FIG. 2B illustrates another implementation of the ML shipping destination prediction system, where the system is implemented at the client-side. In this example, the ML shipping destination model 170 is implemented as part of a web browser 232. The client system 230 may be, for example, a client computer that is executing the web browser 232, which can be used by a customer to send shipping requests 236 over the network 120 to a shipping service 242 on a server system 240.

In this example, the web browser 232 may use the prediction model to, for example, determine a predicted shipping location for a shipping request 236. For example, in some embodiments, the web browser's functionality may be augmented using a plugin or some other client library, and the added functionality may generate predictions for shipping destinations under certain circumstances or triggering conditions. In some embodiments, the shipping destination prediction feature may be implemented with or as part of another web browser component such as a password manager, which may be used to select different prediction models for websites.

In some embodiments, when the web browser 232 navigates to a particular website (e.g. an online shopping website), the web browser may automatically predict a shipping destination for the user. This prediction may be determined based on the destination prediction data 234, which may be stored locally on the client system 230, and may include user data such as the user's past shipment requests or past web surfing activities. In some embodiments, the web browser 232 may generate such predictions and use the prediction results to auto-populate web forms from the client side. In some embodiments, the web browser 232 may be able to use the prediction model for many different websites where shipping destinations are needed, so that predictions for shipping destinations may be generated whenever a shipping destination field is encountered, for any of these websites. In some embodiments, the client-side implementation of this figure may be preferable to the server-side implementation, because it may better protect the privacy of the user' data, such as data about the user's past shipments and online shopping behavior, etc.

In some embodiments, the shipping destination prediction model may be maintained by the web server, and periodically pushed to the web browser to update the browser's prediction behavior. In some embodiments, the model push may be requested or configured via a service API, which may be provided by the item ordering service 130 or shipping destination prediction system 160.

Figure 3:
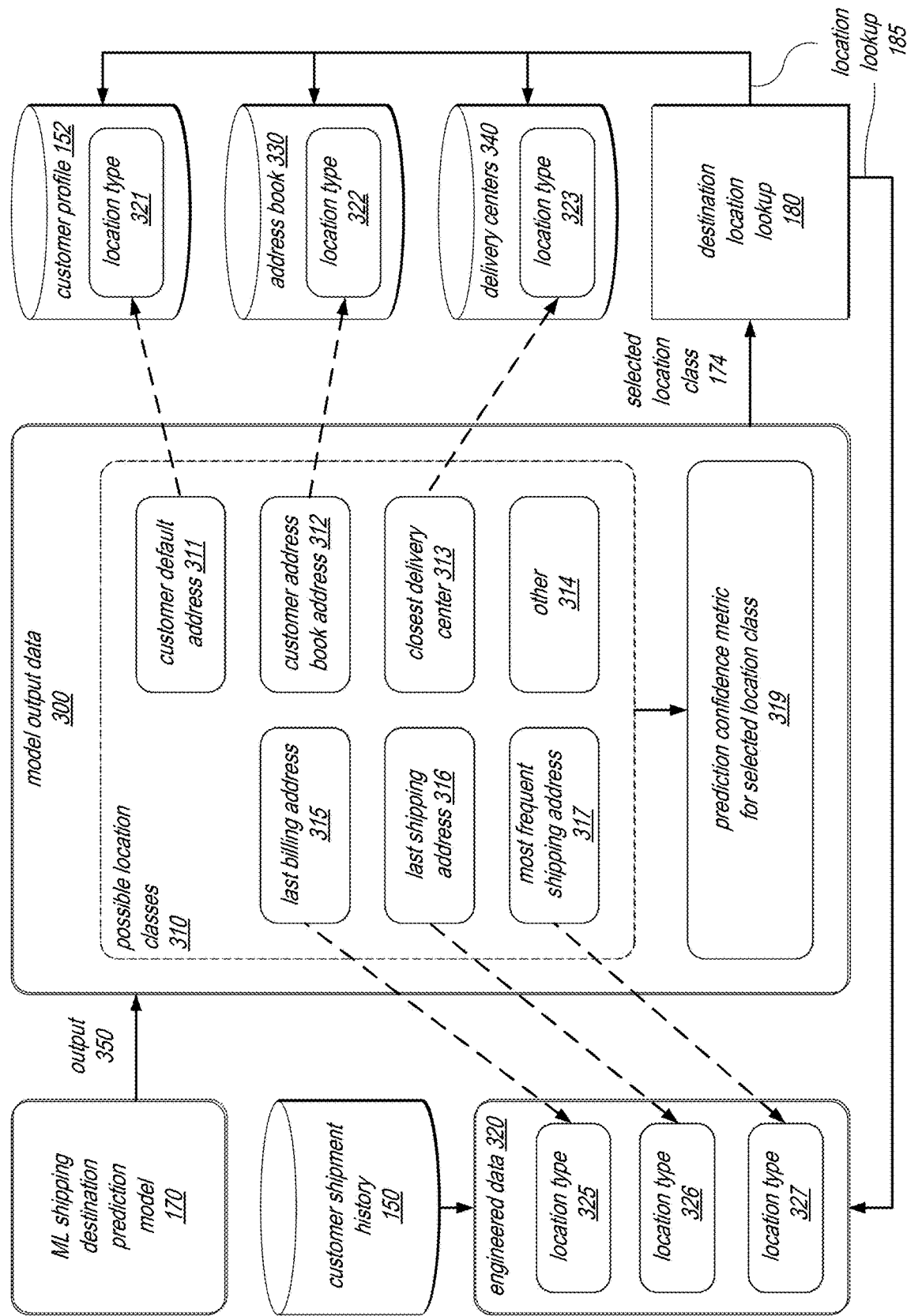
FIG. 3 illustrates example model output data that can be produced by a machine-learned shipping destination prediction model, according to some embodiments.

FIG. 3 illustrates example model output data that can be produced by a machine-learned shipping destination prediction model, according to some embodiments. As shown, the figure shows an example model output data 300 that can be outputted 350 by an embodiment of the ML shipping destination prediction model 150. As shown, the model output 300 may include one or more location classes selected from a set of possible location classes 310. In this example, the set of location classes include seven location classes.

In some embodiments, the possible location classes may include a customer default address 311, which may correspond to a location type 321 in the customer profile 152. In some embodiments, a customer may specify a default or primary address receive his or her shipments. For example, for some customers, the default address may be his or her primary residence. In some embodiments, one location class may be a customer address book address 312, which may refer to a location type 322 from an address book 330 of the customer. In some embodiments, the address book 330 may be stored as part of the customer profile 152. In some embodiments, the customer address book may hold various addresses that the customer has saved in the past for shipping destinations or other addresses. For example, in some embodiments, the address book 330 may include the customer's multiple residences, work addresses, or past gift destination addresses. In some embodiments, another location class may be a closest delivery center 313, which may refer to a location type 323 in a delivery centers repository 340. In some embodiments, the delivery centers data 340 may not be specific to a customer, but may represent a list of delivery centers or item pickup locations that can be used to temporarily store an item until it is picked up by a customer. In some embodiments, this location may be selected based on a customer's current location.

As shown on the left-hand side of the figure, a number of other location classes may be used to designated location types in the engineered data 320. The engineered data 320, may be data generated by the engineered data generator 164, as discussed in connection with FIG. 1. As shown in this example, such location classes may include a last billing address 315, a last shipping address 316, and a most frequent shipping address 317, which corresponds to these distinct types of location data 325, 326, and 327 in the engineered data 320. In some embodiments, such type of data may be computed from the customer shipment history 150, and maintained as engineered data for the prediction model. For example, to determine the most frequent shipping address 317, the ML shipping destination prediction system may read a fixed number of shipping records (e.g. six) or shipping records from a fixed time window (e.g. last year) and determine the most frequent shipping address used in those shipping records. In some embodiments, these types of engineered location types may also be generated by the prediction model as predicted shipping destination locations.

As shown, in some embodiments, the set of possible location classes 310 may also include an "other" class 314, which may or may not correspond to any actual type of location data in the customer data or engineered data. In some embodiments, the "other" class may be used to indicate that the prediction model cannot confidently determine one of the other location classes. Accordingly, this output class may indicate that an acceptable shipping destination cannot be accurately predicted. It is noted that the types of location classes provided in the figure are merely examples, and other location classes may be used in other embodiments of the ML shipping destination prediction system.

As shown, in some embodiments, the prediction model 170 may also output a prediction confidence metric 319 for the selected location class. For example, the prediction confidence metric may be a value that ranges from 0 to 1, and indicate a level of confidence of the selected class (e.g. where 1 represents the most confident selection, according to the model). In some embodiments, such confidence metrics may be used by the item ordering service to decide how to treat the output of the prediction model. For example, in some embodiments, the item ordering service may only accept an output from the model if its confidence level is above a configurable threshold. In some embodiments, the prediction model may simply output a corresponding confidence metric for all location classes in the set 310, and allow the item ordering service to decide how to use the output data. For example, in some embodiments, the item ordering service may provide a selection of the top three location classes predicted by the model, or sort the location classes according to their confidence level. In some embodiments, the behavior of the item ordering service with respect to the model output can be configured via a configuration interface. For example, such configurations may be exposed for the destination location lookup component 180 to determine which location types to lookup 185, as shown.

As may be appreciated by those skilled in the art, in some embodiments, the types of destinations selected by the prediction model may include different virtual locations for digital goods, instead of physical shipping locations. In some embodiments, these types of virtual locations may be specified by other types of addresses such as email addresses, social media account IDs, telephone numbers, network addresses of devices (e.g. a smart TV or computer, etc.). The destination prediction system and model discussed herein may be used to select from these types of virtual locations as delivery destinations, without departing from the spirit of these disclosures.

Figure 4:
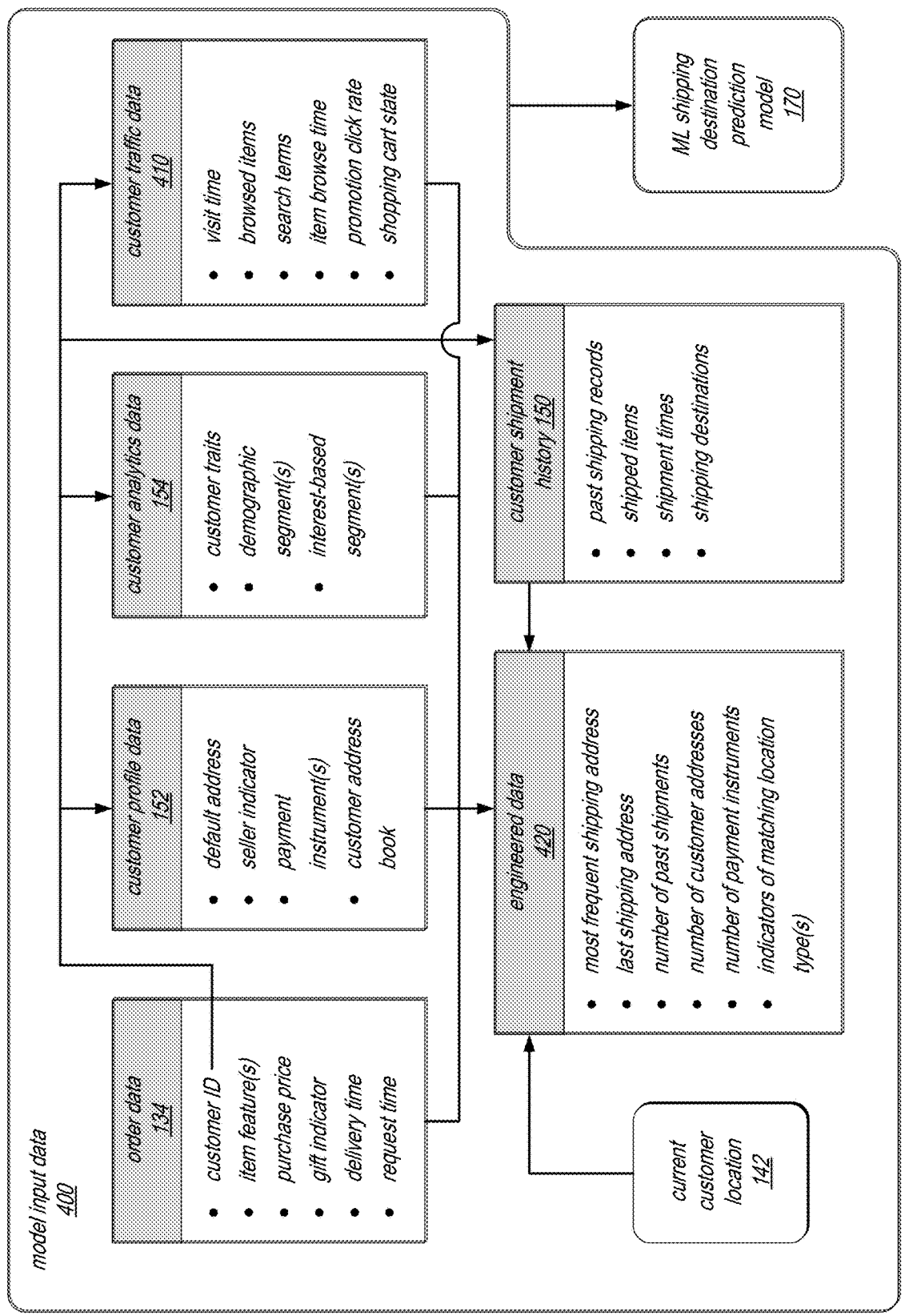
FIG. 4 illustrates example model input data for a machine-learned shipping destination prediction model, according to some embodiments.

FIG. 4 illustrates example model input data for a machine-learned shipping destination prediction model, according to some embodiments. As discussed, the example data shown in the figure may be collected and used for prediction with the customer's permission.

In some embodiments, the model input data 400 may include the order 134, as discussed in FIG. 1. In some embodiments, the order data may represent an order that is being constructed by a customer to be shipped. The order data 134 may include the customer's identifier, which may be used to query up other data about the customer that are used by the shipping destination prediction model 170. In some embodiments, the order data 134 may also include other data such as the features of the items being ordered, the purchase price of the items, a gift indicator indicating whether some of the items are gifts, a delivery time for the order, and/or a request time, which indicates the time that the order request is received by the item ordering service. In some embodiments, as the order is being constructed, the order data may change, so the prediction model may be configured so that it can tolerate missing attributes in the order data. In some embodiments, the order data may use item identifiers to refer to one or more data stores or tables for the items, so that additional features about the items an be used as input to the prediction model.

In some embodiments, the model input data 400 may include the customer profile data 152. In some embodiments, the customer profile data 152 may be data that is provided by the customer, modifiable by the customer, or visible to the customer. Such data may include, for example, the default address for the customer, a seller indicator indicating whether the customer sells items on the item ordering service (in which case it may use a large number of shipping destinations), a number of different payment instruments used by the customer (e.g., credit cards, bank accounts, etc.), and/or a customer address book of past addresses saved by the customer for various reasons. In some embodiments, the customer profile data 152 may also indicate relationships with other customers, such as family members or friends. In some embodiments, the customer profile data for some related customers may also be used as input data to the prediction model.

In some embodiments, the model input data 400 may include the customer analytics data 154. In some embodiments, the customer analytics data 154 may include data that are determined by the item ordering service (or some third-party system) about the customer. This data may include analytic characterizations about the customer, which may be used to, for example, make promotions or select offers for the customer. Such analytics data may include for example, customer traits (e.g., age, gender, marital status, etc.), demographic segment information (e.g., age category, geographic region, etc.), and/or interest-based segment information (e.g., whether the customer is interested in baby products, pet products, etc.). In some embodiments, the analytics data may indicate one or more flags that describe a customer's past behavior with respect to the item ordering system. For example, the analytics data may include flags (e.g. Boolean values) indicating whether the customer is a high purchase customer, whether the customer is an active customer, whether the customer is a one-time purchase customer, and whether the customer is an institutional buying customer.

In some embodiments, the model input data may include customer traffic data 410. In some embodiments, the customer traffic data may include data that are gathered about the customer's detectable interactions with the interface of the item ordering service. In some embodiments, such data may be captured by the item ordering service during each visit of the customer (e.g., each logon session). In some embodiments, the traffic data 410 may be used to compute some of the analytics data 154 for the customer. As shown, customer traffic data may include data such as visit time (e.g. a length of a customer's visit to the website or the time of the day or day of the week that the customer visits the website), browsed items (or categories of browsed items), various search terms that were used by the customer, item browse times indicating how long an item viewed a particular item, and/or promotion click rate, which may indicate how often the customer clicked on an offer or type of linked content provided by the user interface. In some embodiments, the item ordering service may allow a customer to maintain a shopping cart or wish list that is persistent from one session to the next. The contents or metadata about these shopping carts and/or wish lists may be used as input to the prediction model. In some embodiments, the customer's traffic data may be limited to only a current session. In some embodiments, the customer's traffic data may span a long time period, for example, for a past month or a past year.

In some embodiments, the model input data 400 may include the customer shipment history 150. In some embodiments, the shipment history data 150 may include the past shipping records of individual customers. In some embodiments, each shipment record may indicate some or all of the date in the order data 134, plus the actual shipping destination. In some embodiments, the shipping records may indicate the item(s) that were shipped, the shipment times (e.g. the time when the shipment began and finished, and/or the times that correspond to various stages of the shipment, etc.), and the shipping destinations. In some embodiments, the shipment records may also indicate whether a shipment was successful or not, or whether a shipment of an item was ultimately returned. In some embodiments, the model input data 400 may be filtered so that only records of successful shipments or shipments that were not returned are used for the prediction model.

In some embodiments, the model input data 400 may include the current customer location 142 as discussed in FIG. 1. In some embodiments, the current customer location 142 may be determined based on an IP address or GPS data detected for the customer, at the time the order data is being created. In some embodiments, the current customer location may indicate a location that is less precise than an actual address. For example, the current customer location data may indicate a regional office, a cell in a cellular network, a zip code, etc. As shown, some of all of the data 134, 142, 150, 152, 154, and 410 may be used to compute additional engineered data 420, for example using the engineered data generator 164, as discussed in connection with FIG. 1.

In some embodiments, the engineered data 420 may include a variety of types of data that are computed for the prediction model 170. In some embodiments, as discussed, such engineered data may be maintained specifically for the prediction model by the ML shipping destination prediction system. As shown, the engineered data 420 may include computed locations from other types of data, such as the most frequent shipping address and the last billing address, which may be computed from the customer shipping history. In some embodiments, the engineered data 420 may also include different types of summary data about the customer computed from the various types of customer data. As shown, the engineered data 420 may include data indicating the number of a customer's past shipments (possibly within a time window), the number of addresses that appear in the customer's shipping records or address book, and/or the number of payment instrument(s) that are used by the customer.

In some embodiments, the engineered data 420 may include one or more types of indicators or flags, which may reflect different types of summary properties computed from the customer's data. For example, as shown, the engineered data may include indicators of whether two or more different types of location data in the customer data (e.g. the default address and the last shipping address) have matching values. As another example, an engineered indicator may be computed to indicate whether some or all of the types of location data for the customer (e.g. the most frequent shipping address and the last shipping address) are different. As one more example, an engineered indicator may be computed to indicate whether some last number of shipment addresses are all the same.

The following definitions show a sample of the indicators used as engineered data for the prediction model, in one embodiment. In the definitions below, acronym "dai" means default address ID, "pai" means previous address ID, "fai" means frequent address ID, "lbai" means last billing address ID, "psa" means parsed shipping address, which is the list of address types to select from (default, mostrecent, mostfrequent, lastbilling, other), and "θ" means a count of unique shipping address in a vector.

$$\text{all\_same\_address\_ids} = \begin{cases} 1, & \text{if } dai = pai = fai = lbai \\ 0, & \text{otherwise} \end{cases}$$

all_diffrent_address_ids =

$$\begin{cases} 1, & \text{if at least one of } dai, pai, fai, \text{ or } lbai \text{ are different} \\ 0, & \text{otherwise} \end{cases}$$

is_default_consistent =

$$\begin{cases} 1, & \text{if } dai = pai \ \& \ psa = \text{default} \ \& \ \theta(psa) = 1 \\ 0, & \text{otherwise} \end{cases}$$

is_frequent_consistent =

$$\begin{cases} 1, & \text{if } fai = pai \ \& \ psa = mostfrequent \ \& \ \theta(psa) = 1 \\ 0, & \text{otherwise} \end{cases}$$

$$\text{is\_default\_frequent\_same} = \begin{cases} 1, & \text{if } fai = dai \\ 0, & \text{otherwise} \end{cases}$$

Depending on the embodiment, similar indicators may also be used, including indicators such as is_default_previous_same, is_default_last_billing_same, is_frequent_previous_same, is_frequent_last_billing_same, is_previous_last_billing_same, etc. All such indicators may be computed as part of the engineered data 420, and provided as input to the prediction model. In some embodiments, the use of these indicators in as part of the engineered data may highlight certain properties during the prediction process, and/or reduce the prediction model's overall size or complexity.

Figure 5:
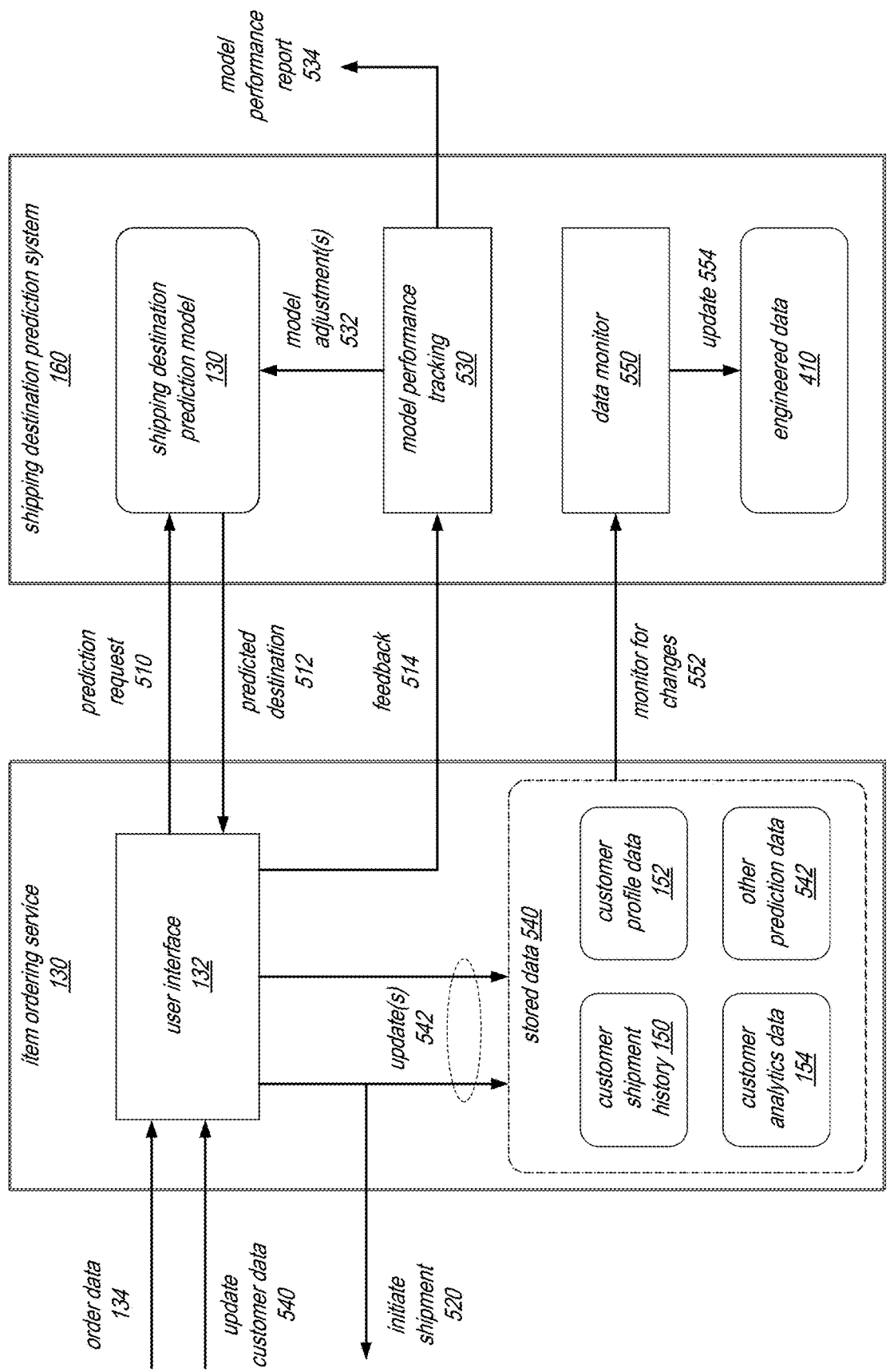
FIG. 5 illustrates components of a machine-learned shipping destination system that perform ongoing tasks to support the execution of the shipping destination prediction model, according to some embodiments.

FIG. 5 illustrates components of a machine-learned shipping destination system that perform ongoing tasks to support the execution of the shipping destination prediction model, according to some embodiments.

As shown, in this example, the shipping destination prediction system 160 implements a model performance tracking module 530, which can be used to track the ongoing performance (e.g. accuracy) of the prediction model 130 based on feedback from 514. In some embodiments, when the user provides the order data 134 to the user interface 132 of the item ordering service 130, as discussed previously, the user interface or item ordering service may generate one or more prediction requests 510 to the prediction system 160. The prediction system may in turn provide predicted destinations 512 as responses back to the item ordering service, which may cause the user interface to display the predicted shipping destination. This process may occur multiple times during a user session, to repeatedly adjust the predicted shipping destination displayed via the user interface based on received information from the user.

In some embodiments, additional information may be received via the user interface 132 that may indicate whether an initial prediction generated by the model 130 is correct or not. For example, in some embodiments, additional order data 134 may cause a previous destination prediction to be changed. As another example, the user may actually provide user feedback to correct the predicted shipping destination, for example, by changing the predicted shipping destination via the user interface. Such additional user input may be provided as feedback 514 back to the model performance tracking module 530. In some embodiments, the performance tracker module may analyze the feedback information and update one or more performance metrics about the model based on the feedback information 514. For example, the performance tracker module may update model performance metrics such as an accuracy, recall, or F1-score metric based on the feedback 514. In some embodiments, he model's performance metrics may be viewed periodically by an administrator of the system 160, and be used to generate model performance reports 534 reporting based on the performance metrics. In some embodiments, the model performance report 534 may indicate a feature importance metric, which shows which input signals are the most important in determining the model's output. In some embodiments, the model performance report 534 may include a confusion matrix, which arranges counts of output location classes in a matrix. The rows of the matrix may indicate the classes predicted by the model, while the columns of the matrix may indicate the true location class (e.g. the ultimate shipping destination selected by the customer). Each cell in the matrix may indicate the counts for a particular model-predicted class and a particular true class. Accordingly, the confusion matrix allows a viewer to easily see what type of location class the prediction model is most confused about.

In some embodiments, the shipping destination prediction system 160 may implement an ongoing model adjustment mechanism to periodically adjust 532 the prediction model 130 based on the model's performance metrics. For example, the prediction system 160 may stop prediction for certain types of orders when it is determined that the predicted destinations for these orders or often incorrect. As another example, the prediction system 160 may perform a limited retraining of the model based on orders that were incorrectly handled by the prediction model. As one more example, the prediction system 160 may programmatically tune certain configurable hyperparameters of the prediction model (e.g. to assign more weight to one decision tree in random forest model) based on the feedback 514.

In some embodiments, the shipping destination prediction system 160 may implement a data monitor 550 to monitor for changes 552 in the stored data 540 of the item ordering service. The stored data 540 may include data that is used by the prediction model 130, such as the customer shipment history 150, the customer profile data 152, the customer analytics data 154, or other types of data used by the prediction model 542.

In some embodiments, the stored data 540 may be updated 542 during the course of operations of the item ordering service 130. For example, the customer profile data 152 may be changed by user updates 540 to the customer data (e.g. to change a default address). As another example, the shipment history 150 may change as a result of more order shipments 520 to the customer. As yet another example, the customer analytics data 154 may change as a result of the customer's ongoing interactions with the item ordering service 130.

As may be understood, these changes in the customer data may cause changes in the engineered data 420 that is needed by the model. In some embodiments, to improve performance of the prediction system 160, the system may monitor 552 the customer data and either immediately or periodically recompute the engineered data 420 based on the changes. In some embodiments, the engineered data 420 may be maintained for a group of active (or all) customers of the ordering service, and all changes to the customer data or stored data 540 will be propagated to engineered data 420 on a periodic basis. In some embodiments, the engineered data 420 may actually be implemented with a common repository as the stored data 540, and the engineered data may be implemented using a feature such as materialized views to automatically generate the engineered data from the stored data. In some embodiments, the engineered data 420 may only be maintained for certain customers who have an active session with the item ordering service or have recently interacted with the item ordering service. Accordingly, any changes in the customer for those customers are monitored and used to update the engineered data. In this manner, less resources are needed to carry out the monitoring 552 and updating 554.

Figure 6A:
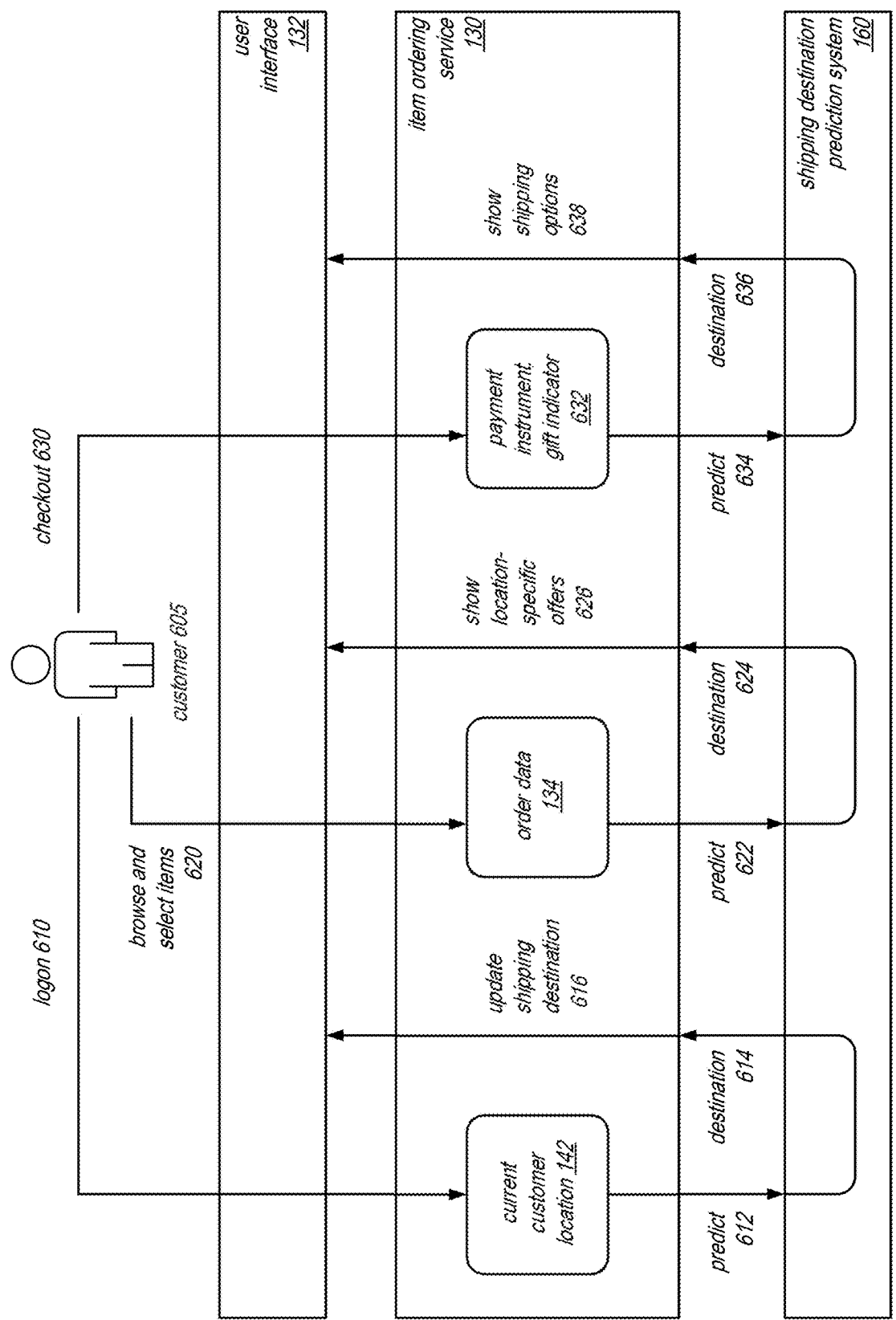
FIG. 6A illustrates a session of a customer to order an item from an item ordering service using a machine-learned shipping destination system, according to some embodiments.

FIG. 6A illustrates a session of a customer to order an item from an item ordering service using a machine-learned shipping destination system, according to some embodiments. The figure depicts an example customer session where the shipping destination prediction system 160 is used multiple times to generate predictions of shipping destinations.

As shown in this figure, a customer 605 is creating an order for an item to be shipped. At operation 610, the customer 605 logs on to the item ordering service 130, which may be a website that allows users to logon in a web session to order items. In some embodiments, a session for predicting the shipping destination may begin before a logon by a user, and a logon by the user is not required to begin the session. In this example, the process of logging on to the item ordering website may trigger the website to determine (e.g. via a customer location resolution module 140) the current location 142 of the customer. In this example, the current customer location 142 is immediately sent to the shipping destination prediction system 160 to predict an initial shipping destination for the customer. In some embodiments, this predicted destination 614 may be used to update 616 the user interface 132 (e.g. a webpage), to show the customer the initially determined shipping destination. For example, the prediction system 160 may determine that the customer is currently at his or her home location, and accordingly, predict that the most likely shipping destination is the customer's default address.

At operation 620, the customer 605 browses the item ordering services' website and selects one or more items to order. For example, the website may implement one or more webpages that allow the customer to add one or more items to a shopping cart. The items selected by the customer may be used to populate a portion of the order data 134 for an order. At this point, the item ordering service 130 may generate another prediction request 622 to the prediction system 160, and obtain another prediction shipping destination 624. Based on this second predicted shipping destination 624, the item ordering service 130 may determine one or more location-specific offers 626, which is to be shown to the customer via the user interface. For example, the prediction system 160 may determine that the order data 134 specifies an order of a book, which is in the same book category as a previous order, which was shipped to the customer's work address. Based on this second predicted shipping destination 624, the item ordering service 130 may recommend one or more other items to be ordered and delivered to the work address, for example, a selection of office supplies.

At operation 630, the customer indicates a checkout operation to the item ordering service 130. In some embodiments, this operation may involve the customer clicking a "checkout" button to finalize the order of items in the shopping cart. In some embodiments, the checkout process may take the customer through a series of webpages to collect the additional order information 632 such as the payment instrument to be used and information indicator whether the items are to be shipped as gifts. In response to this information, the item ordering service may generate a third prediction request 634 to the prediction system 160, which in turn generates a third predicted shipping destination 636. Based on the third predicted shipping destination, the item ordering service may determine one or more shipping options 638 and update the user interface to display the shipping options. In some embodiments, the shipping options may indicate one or more shipping offers to be selected by the customer. The one or more shipping options may indicate a shipping service provider, a cost for the option, and an estimated delivery time for the option. For example, the prediction system 160 may determine that the order represents a gift, and adjust the predicted shipping destination to a last destination for a similar gift. In this manner, the customer may be presented with different types of offers, options, and other information during his or her ordering session. In some embodiments, the predicted shipping destination may be used to auto-populate forms during the ordering process, so that the process can be simplified for the user to provide a better user experience.

As may be appreciated by those skilled in the art, in some embodiments, the destinations selected by the prediction system and model discussed in the figure may include virtual locations for digital goods, instead of physical shipping locations. In some embodiments, these types of virtual locations may be specified by other types of addresses such as email addresses, social media account IDs, telephone numbers, network addresses of devices (e.g. a smart TV or computer, etc.). The destination prediction system as discussed herein may be used to select from these types of virtual locations as delivery destinations, without departing from the spirit of these disclosures.

FIG. 6B illustrates a graphical user interface (GUI) that indicates an auto-populated shipping destination address as determined by a machine-learned shipping destination prediction system, according to some embodiments.

As shown, the item shipping information view 640 is a GUI that shows the shipping information for some items being ordered by a user. In some embodiments, the GUI 640 may be generated by an item ordering service, which may implement a web server. In some embodiments, the GUI 640 may be implemented by a dynamically generated webpage, which can be displayed on a web browser. In some embodiments, the GUI 640 may be generated during a checkout process of a user, where the user is finalizing an order of items, and specifying how the items should be delivered.

As shown, in this case the user is David. In some embodiments, the item ordering service may be aware of the identity of the user that is performing the checkout process (e.g. via a logon process), and some of the customer data used to make shipping destination predictions may be associated with that user.

As shown, in this example, there are two items in the order (650 and 660), which are to be shipped to different locations. In this example, the predicted shipping destinations 652 and 662 may be generated by one or more embodiments of the ML shipping destination prediction system 160, as discussed. Thus, in some embodiments, the item ordering service 130 may be configured to assign different shipping addresses to different items in a single order. In this example, because the second item (chocolates) is indicated to be a gift, a different shipping destination 662 is selected for that item.

As shown, in some embodiments, the GUI 640 may also indicate the location types 654 and 664 associated with the predicted shipping destinations. For example, the location types may correspond to the location classes determined by the prediction model, as discussed previously. Additionally, in some embodiments, the GUI may also provide a confidence level 656 and 666 for the predicted shipping destinations. This data provides more information to the user about the prediction decisions generated by the prediction model. In some embodiments, the GUI 640 may also provide user controls (e.g. buttons 659 and 669) to change the predicted shipping destinations manually. In some embodiments, clicking the button 659 or 669 may cause the GUI to provide a full list of possible location types from the customer data, possibly ordered by their prediction confidence level, and allow the user to select one of the location types as the actual shipping destination.

As shown, in some embodiments, the GUI 640 may also provide addition shipping information such as a "get it by" date 658 and 668. In some embodiments, such information may be provided as a shipping option, which specify information such as a shipping service provide, an estimated cost of the option, and an estimated delivery time for the option. In some embodiments, the GUI may allow the user to select from a number of different shipping options. In some embodiments, the different shipping options (or the properties of these options) may be determined based on the predicted shipping destinations 652 and 662.

As shown, in some embodiments, the GUI 640 may also provide a location-based offer 670. Depending on the embodiments, the location-based or location-specific offer may be provided in other types of views or GUIs. For example, in some embodiments, the predicted shipping location may be shown in other webpages such as a landing page, a user's homepage, a search results page (e.g. when searching for items), or an item detail page, among others. In some embodiments, the location-based offer may be determined based on the predicted shipping destination (e.g. destination 662). For example, in this case, the location-based offer specifies that fresh flowers may be added to the order for $8.00, and delivered for free to the same address as the gift chocolates. For example, the item ordering service may determine, based on predicted shipping destination 662, that a nearby flower vendor has fresh flowers that can be included in the same shipment. Accordingly, by using the predicted shipping destination 662, the item ordering service can make better targeted offers to the user. As shown, the user can accept the location-based offer by clicking the add button 672, and then initiate the shipment by clicking the proceed button 680.

Figure 7:
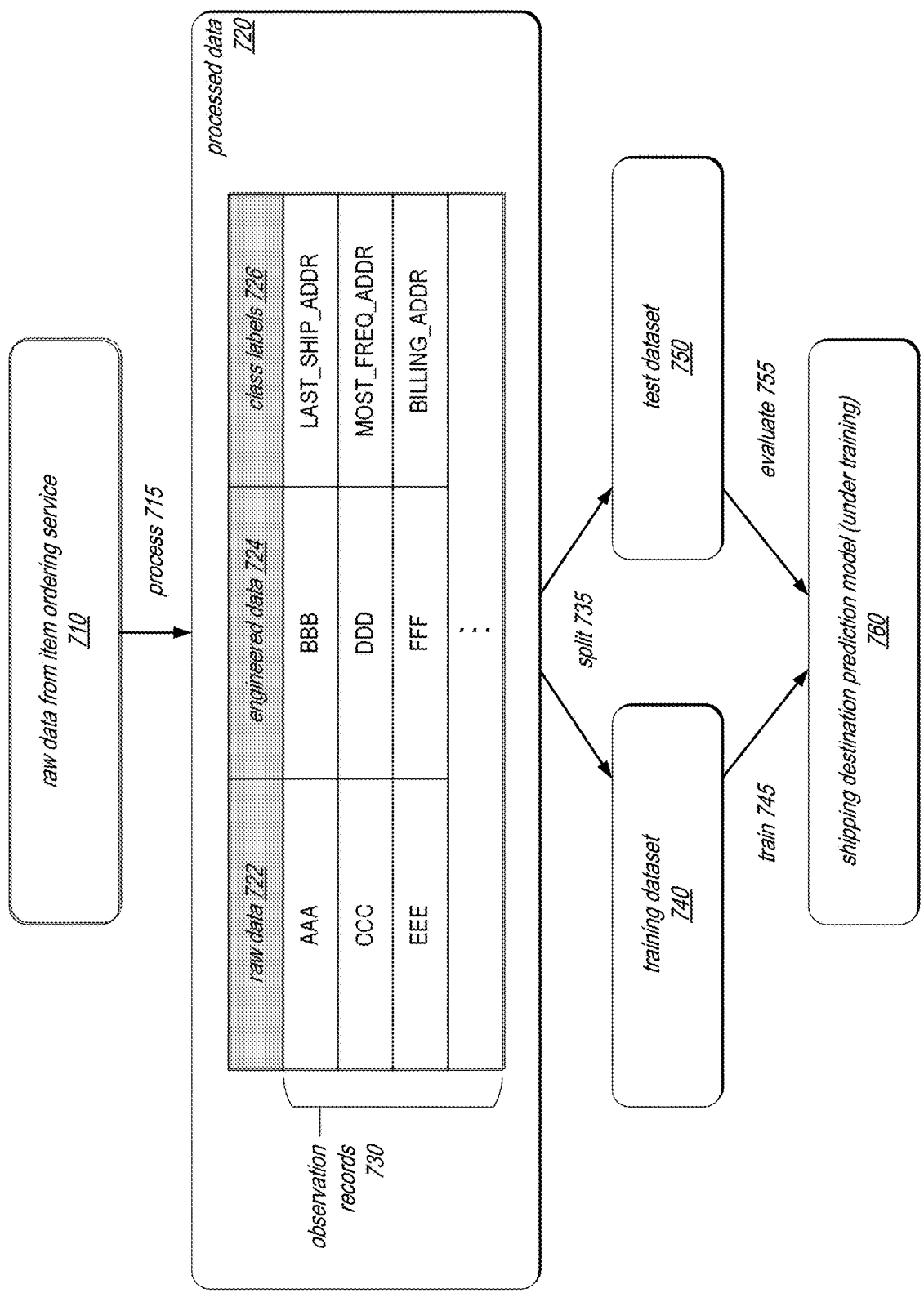
FIG. 7 illustrates a process of training a machine-learned shipping destination prediction model, according to some embodiments.
Figure 10:
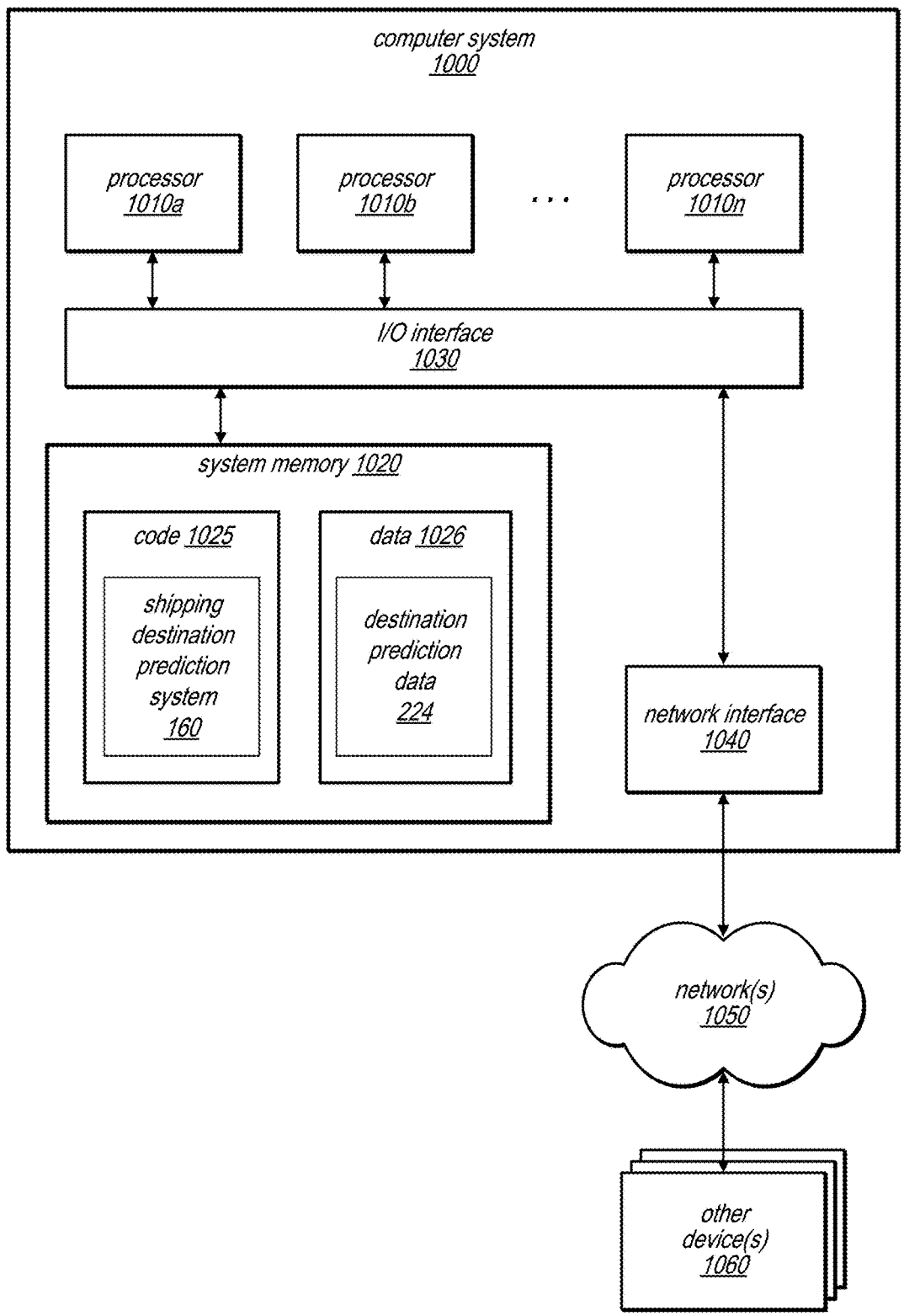
FIG. 10 is a block diagram illustrating an example computer system that can be used to implement a machine-learned shipping destination prediction system that predicts shipping destinations based on different types of customer data, according to some embodiments.

FIG. 7 illustrates a process of training a machine-learned shipping destination prediction model, according to some embodiments. The illustrated process may be performed as a machine learning process, which may be executed on a computer system such as shown in FIG. 10, or using a machine learning service, as discussed in connection with FIG. 2A.

As shown, the process may begin with obtaining a set of raw data 710 from the item ordering service. In some embodiments, the raw data 710 may include any of the types of data discussed in connection with FIG. 4. In some embodiments, such data may be directly queried from one or more data repositories (e.g. from database tables) maintained by the item ordering service. In some embodiments, the raw data may be provided via a raw data dump, which is the migrated to the data stores using by the computer system performing the training. In some embodiments, the raw data 710 may be segmented based on one or more dimensions in the data, such as the type of customer, type of order, or region of the orders, etc. The segmented raw data may be used to create a more customized prediction model.

As shown, the raw data 710 is then processed 715 or prepared into a processed data 720. As shown, the processed data 720 may include individual records, or observation records 730, that are to be used to either train or test the prediction model 760. Each observation record may correspond to one shipping record, and represent one observation (e.g. an order that was shipped).

In some embodiments, during the processing 715, some records from the raw data may be filtered or excluded. For example, in some embodiments, gift orders or particular types of orders may be excluded according to the requirements of the particular model. In some embodiments, various types of raw data may be joined or associated so that each observation record will contain a combination of attributes 722 from various types of the raw data. For example, in some embodiments, information about a particular customer (e.g. customer profile data) may be joined into a shipment record to create an observation record 730 with both shipment record attributes and customer profile attributes. In some embodiments, the joining may be performed as the raw data is queried.

In some embodiments, the processing 715 may fill in certain missing values from the raw data 710. For example, in some embodiments, a customer data field may be missing for some reason (e.g. a missing segmentation attribute for a customer's analytics data). In some embodiments, the processing step 715 may fill in a default value (e.g. a catch all segment) for the missing value. In some embodiments, the processing step may also fill in a value for an engineered data field, if the engineered data attribute cannot be computed.

In some embodiments, the observation records 730 may be further expanded to include various engineered data attributes 724, which may be needed to train the prediction model. In some embodiments, the engineered data 724 may be constructed so that it mirrors the engineered data 420 to be computed as used by the model in the production environment. For example, in some embodiments, engineered data 724 may be computed to reflect the last shipping destination for an observation record, the most frequent shipping destination for an observation record (e.g., in a window of last six shipments), etc. In some embodiments, Boolean indicators may be generated to indicate certain properties of the observation records. For example, indicators may be generated to indicate whether two or more of the location types corresponding to a particular record or customer is the same (e.g. whether the customer's default address is the same as the customer's most frequent shipping address, whether the customer has used the same shipping address for the past four shipments, etc.).

As shown, each observation record 730 may be labeled with classes labels 726 that correspond to the various classes to be predicted by the model. The class labels 726 may be applied in such a way that they refer a location type in the data that matches the actual shipping destination of the corresponding shipment record. In this manner, the class labels 726 may represent truth labels for the classification task to be learned by the model. In some embodiments, a consistent tiebreaker process is used to select a class label 726 when the shipping destination of an observation record matches multiple location types in the data. For example, in some embodiments, where some of the customer location data are the same, the following tiebreaker procedure may be used to assign the class label: default address>>most frequent shipping address>>most recent shipping address>>last billing address>>other. In some embodiments, a "multiple address" class label may be used to tag observation records associated customers who have used more than one address in a recent window of orders. In some embodiments, the class label 726 may be generated during the query from the raw data stores, for example, using Structured Query Language (SQL) logic.

As shown, the process may then split 735 the processed data 720 into one or more training datasets 740 and one or more test datasets 750. In some embodiments, the training dataset 740 and test dataset 750 may be filtered the same way, or in a pseudorandom fashion, so that the two datasets have the same or similar sample properties. In some embodiments, the two datasets may be sampled with different sampling criteria. For example, in some embodiments, the test dataset 750 may be constructed to filter out trailing (or past) shipment records, so that only the most recent shipment records are used as observation records to test the prediction model.

The splitting 735 of the processed data 720 may be performed in a variety of ways, depending on the needs of the training process. In some embodiments, for example, a 70-30 split based on the number of records may be used to perform the split. In some embodiments, customers with a large number of orders or shipments (e.g. business entities) may create an undesired bias in the model. Thus, in some embodiments, the split 735 may be performed by customer ID. In some embodiments, the customer ID may be used to split the training and test datasets, so that there is no overlap between test and training sets. In some embodiments, the split may be performed to allow for some degree of overlap in customers. In some embodiments, the split is performed to randomly but a filter is applied to filter out duplicate customer IDs in the processed data 720. In some embodiments, one or more attributes of the engineered data 724 may be used as the criterion to perform the split 735.

As shown, once the split 735 is performed, the datasets 740 and 750 may be used to perform the machine learning process to train 745 the prediction model 760, and then evaluate 755 the prediction model 760. In some embodiments, the training 745 may be used to adjust parameters in the model, so that the model can accurately predict the class label 726 based on the input data. In some embodiments, the evaluation 755 may not change the parameters of the model, but only use the test data to check the accuracy of the model. In some embodiments, the machine learning process may alternate between training iterations and evaluation iterations, until a model performance criterion is met. At that point, the machine learning process may be stopped. In some embodiments, the machine learning process may include additional rounds of hyperparameter tuning, which may use a different dataset from the training and test datasets. The additional dataset may be used to iteratively tune the model's hyperparameters, which may include parameters about the meta-properties of the model. For example, in some embodiments, for a extra tree classifier model, a hyperparameter tuning phase may be used to select values for the trees used in the model, and the maximum depth of each tree. In some embodiments, a machine learning process can be used to select a model type among different types of ML models.

Figure 8:
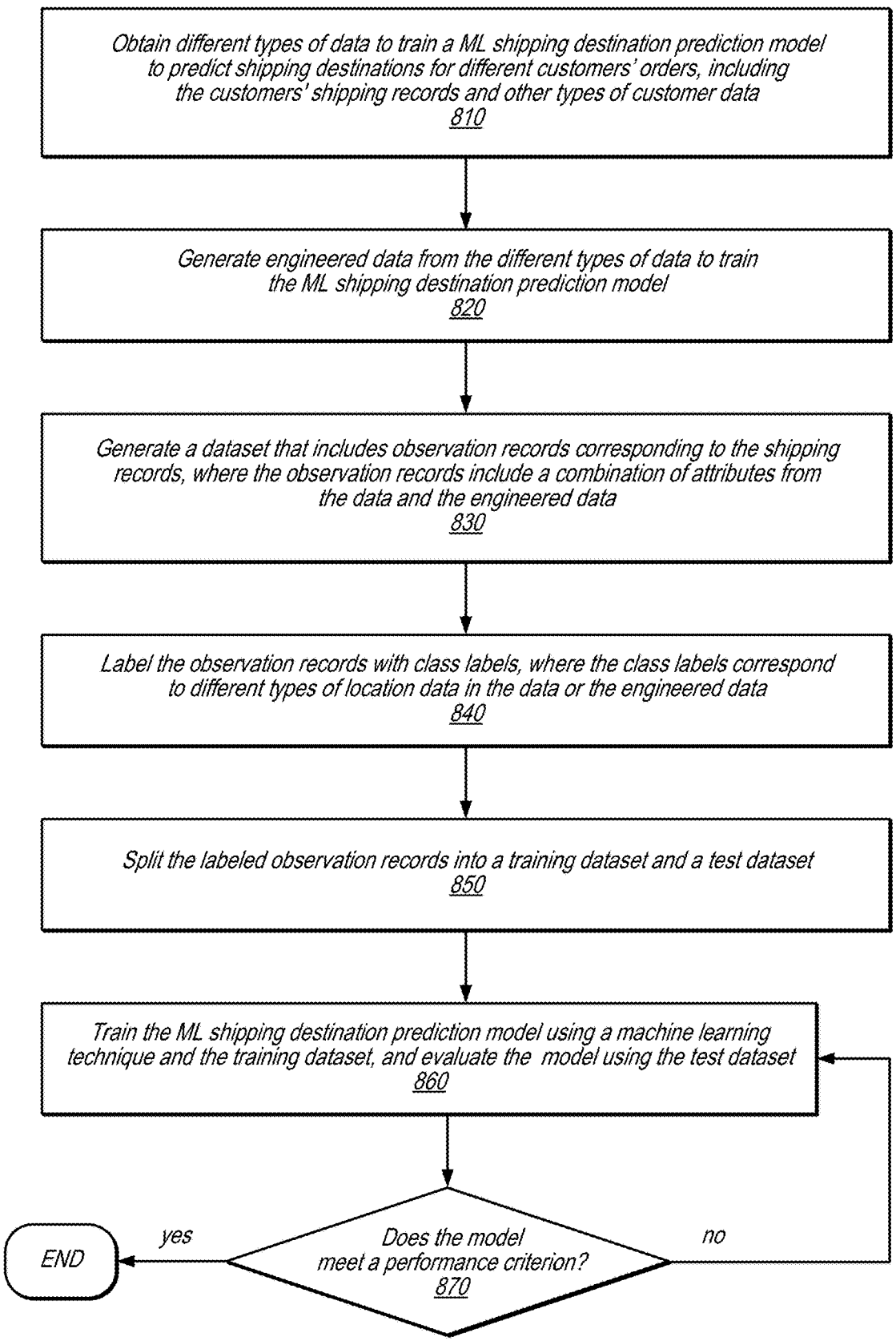
FIG. 8 is a flow diagram illustrating a process of training a machine-learned shipping destination prediction model, according to some embodiments.

FIG. 8 is a flow diagram illustrating a process of training a machine-learned shipping destination prediction model, according to some embodiments. In some embodiments, the depicted process may be performed by a computer system configured to perform a machine learning process, such as the machine learning service 226 of FIG. 2A.

The process begins at operation 810, where different types of data are obtained to train a ML shipping destination prediction model. In some embodiments, the model may be model 760 of FIG. 7. The model is to be trained to predict shipping destination (in terms of location classes) for different customers' orders. In some embodiments, the different types of data may include the customers' shipping records and other types of customer data such as the customer's profile data and the customer's analytics data. In some embodiments, each customer of the item ordering service may be associated with one or more customer accounts. Individual customer accounts may be stored at the item ordering service, and may include customer data such as the different types (e.g. past shipping or delivery records, customer profile, customer analytics data, etc.) associated with an individual customer. In some embodiments, the different types of data may be obtained as raw data 710, as discussed in FIG. 7. In some embodiments, the different types of data may be obtained from an item ordering service, and may include all of the types of model input data shown in FIG. 4.

At operation 820, engineered data is generated from the different types of data, which is also used to train the ML shipping destination prediction model. In some embodiments, the engineered data may be the engineered data 724 of FIG. 7, and may include all of the engineered data 420 discussed in connection with FIG. 4. In some embodiments, the engineered data may be computed on the fly, as the different types of data are retrieved from source data stores (e.g. data stores of the item ordering service).

At operation 830, a dataset is generated that includes observation records corresponding to the shipping records, where the observation records include a combination of attributes from the data and the engineered data. In some embodiments, this operation may be performed in similar fashion as the processing step 715 of FIG. 7. In some embodiments, for example, the incoming raw data may come from multiple database tables or data sources, and the different types of data may be joined to individual shipping records. Thus, in some embodiments, each observation record may correspond to a shipping record. In some embodiments, an observation record may include all attributes that are to be used as model input, include some or all of the attributes shown in FIG. 4.

At operation 840, the observation records are labeled with class labels. In some embodiments, the labeling may be performed in similar fashion as discussed in connection with processing step 715 of FIG. 7. In some embodiments, the class labels may include the class labels shown in FIG. 3. Each observation record may be labeled so that the class label corresponds to a type of location data that matches the shipping destination of the record. Accordingly, the class labels may represent truth labels for each of the observation records.

At operation 850, the labeled observation records are split into a training dataset and a test dataset. The split may be performed in similar fashion as the splitting step 735 discussed in connection with FIG. 7. In some embodiments, the split may be performed in a pseudorandom fashion at the individual record level. In some embodiments, the split may be performed along a particular dimension (or dimensions) of the observation records, for example, based on the customer ID. In some embodiments, the split may be performed so that no overlap of records (or customer ID) is permitted. In some embodiments, the split may be performed to permit some degree of overlap.

At operation 860, the ML shipping destination prediction model is trained using the training dataset, and evaluated using the test dataset. In some embodiments, these operations may be performed in similar fashion as discussed for operations 745 and 755 of FIG. 7. In some embodiments, the training process may involve multiple training iterations and/or testing iterations, which may each use a different training or test dataset. In some embodiments, the training process may also involve a hyperparameter tuning phase to select hyperparameters of the prediction model, which may also use a different dataset of observation records.

At operation 870, a determination is made whether the model being trained meets a performance criterion. In some embodiments, this determination may be made during a testing phase of the model, where the model is evaluated without changing the model, using a test dataset. In some embodiments, as shown, if the model does not meet the performance criterion (e.g. an accuracy level), additional training and testing may be performed. If the model does meet the performance criterion, the training process may be stopped.

As may be appreciated by those skilled in the art, in some embodiments, the destinations selected by the prediction system and model discussed in the figure may include virtual locations for digital goods, instead of physical shipping locations. In some embodiments, these types of virtual locations may be specified by other types of addresses such as email addresses, social media account IDs, telephone numbers, network addresses of devices (e.g. a smart TV or computer, etc.). The destination prediction system as discussed herein may be used to select from these types of virtual locations as delivery destinations, without departing from the spirit of these disclosures. For example, in some embodiments, a delivery destination prediction system similar to the shipping destination prediction system 160 of FIG. 1 may be used to select from a number of different virtual or electronic addresses to predict the delivery destination of a digital good (e.g. a movie, a software, etc.).

Figure 9A:
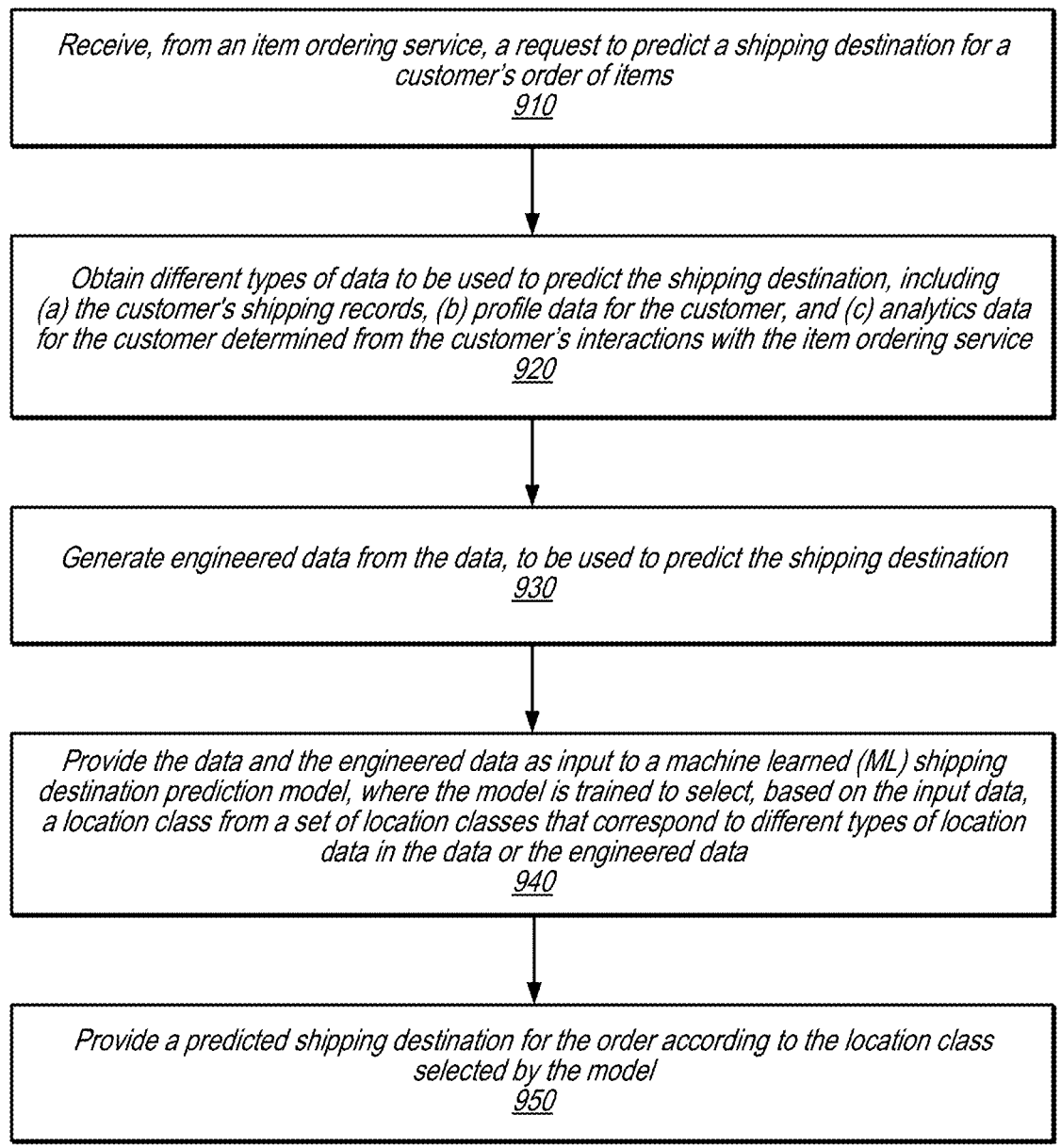
FIG. 9A is a flow diagram illustrating a process of executing a machine-learned shipping destination prediction model, according to some embodiments.

FIG. 9A is a flow diagram illustrating a process of executing a machine-learned shipping destination prediction model, according to some embodiments. In some embodiments, the depicted process may be performed by the ML shipping destination prediction system 160 as discussed in connection with FIGS. 1 and 6A.

At operation 910, a request is received from an item ordering service. The request asks the shipping destination prediction system to predict a shipping destination for a customer's order of one or more items. For example, in some embodiments, the item ordering service may make calls to the shipping destination prediction system based on different triggering events during a user's session with the item ordering service, as shown in FIG. 6A. Such calls or requests may be accompanied with additional information or data about an order that is being constructed by the user.

At operation 920, different types of data are obtained to be used to predict the shipping destination. The data may include, for the customer associated with the order, (a) the customer's shipping records, (b) profile data for the customer, and (c) analytics data for the customer determined from the customer's interactions with the item ordering service. In some embodiments, the data obtained may include any data shown in the model input data 400 of FIG. 4. In some embodiments, the data may be retrieved from one or more data repositories, which may be maintained by the item ordering service. In some embodiments, the data may be provided to the shipping destination prediction system, for example via one or more input parameters. In some embodiments, each customer of the item ordering service may be associated with one or more customer accounts. Individual customer accounts may be stored at the item ordering service, and may include customer data such as the different types (e.g. past shipping or delivery records, customer profile, customer analytics data, etc.) associated with an individual customer. In some embodiments, the shipping destination prediction system may employ another subsystem to obtain the information, for example, by invoking the customer location resolution module 140 of FIG. 1 to obtain a current location for the customer.

At operation 930, engineered data is generated from the different types of data obtained. The engineered data may be provided as input to the prediction model to predict the shipping destination. In some embodiments, the engineered data may be generate using an engineered data generator 164, as discussed in connection with FIG. 1. The engineered data may include some or all of the engineered data 420 of FIG. 4. In some embodiments, the engineered data may be computed on the fly, in response to a prediction request. In some embodiments, some of the engineered data may be precomputed, either periodically or based on detected data changes in the underlying data. In some embodiments, the engineered data may be stored or cached by the shipping destination prediction system, so that it can be easily reused for multiple prediction requests on the same customer or the same order.

At operation 940, the different types of obtained data and engineered data are provided as input to the ML shipping destination prediction model. The model is a ML prediction model that has been trained to select, based on the input data, a location class from a set of location classes that correspond to different types of location data in the data or the engineered data. In some embodiments, the ML prediction model may be the model 170 of FIG. 1. Depending on the embodiment, the model be structured as different ML model types, such as linear models, tree-based models (including extra tree or random forest models), or neural network models. In some embodiments, multiple ML models, possibly of different types, may be used in combination as the shipping destination prediction model.

At operation 950, a predicted shipping destination is provided for the order by the shipping destination prediction system, according to the location class selected by the model. In some embodiments, this operation may be performed using a destination location lookup module 180, as discussed in connection with FIG. 1. The lookup module may be configured to take a predicted location class and lookup the data in a location field that corresponds to that class. For example, if the predicted location is the default address class, the lookup module may be configured to retrieve the default address for the customer associated with the order. In some embodiments, the lookup module may be implemented by the shipping destination prediction system 160, so that the actual destination is returned to the item ordering service. In some embodiments, the lookup module may be implemented outside the shipping destination prediction system 160, so that the item ordering service receives the predicted class and performs the lookup accordingly.

Figure 9B:
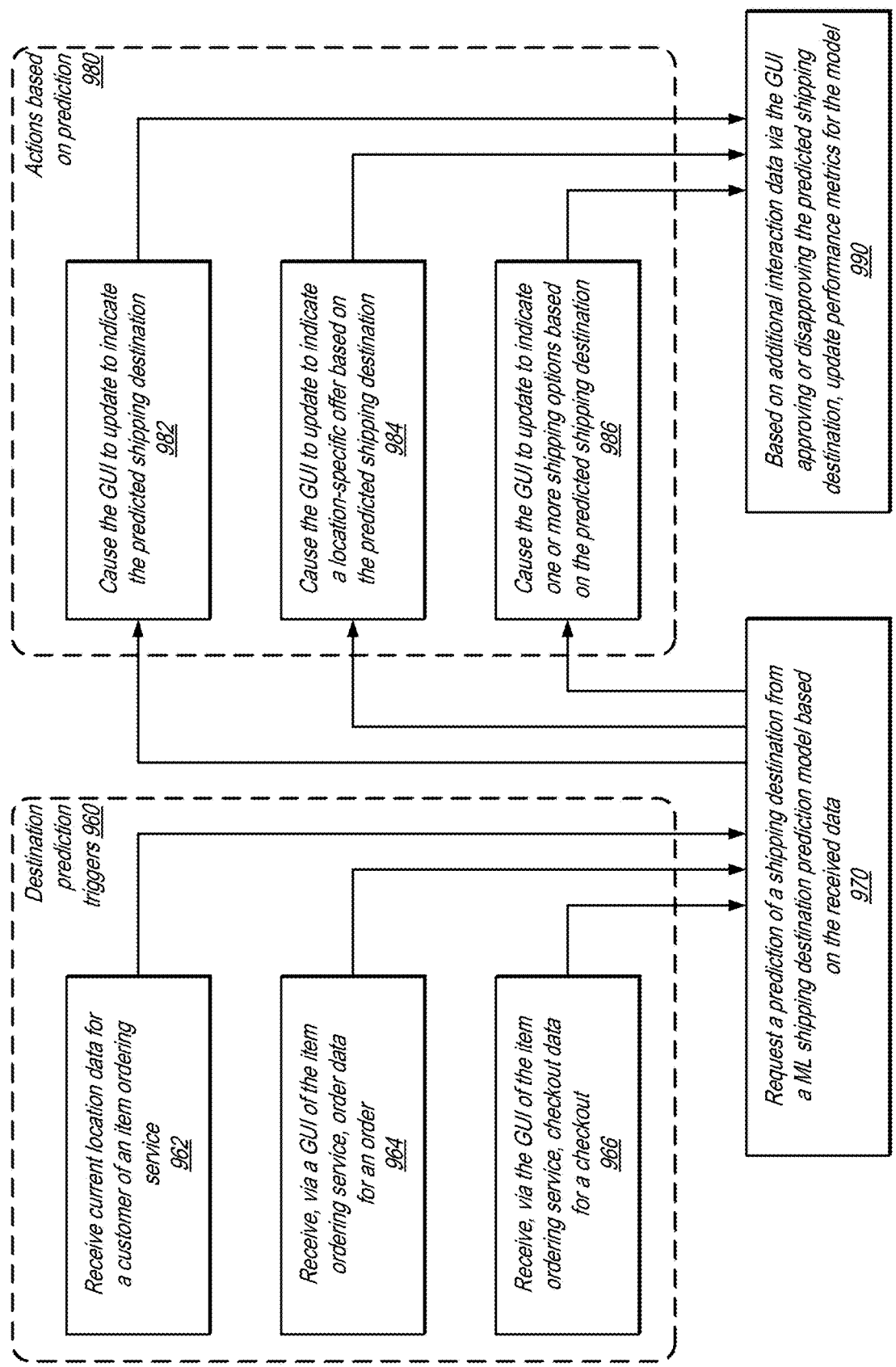
FIG. 9B is a flow diagram illustrating a process of using a machine-learned shipping destination prediction model to update the GUI of an item ordering service, according to some embodiments.

FIG. 9B is a flow diagram illustrating a process of using a machine-learned shipping destination prediction model to update the GUI of an item ordering service, according to some embodiments. In some embodiments, the depicted process may be performed in part using the user interface 132, as discussed in connection with FIGS. 1 and 6A, or the GUI 640 shown in FIG. 6B.

As shown, the figure depicts a number of destination prediction triggers 960 that could cause a GUI (e.g. user interface 132) of an item ordering service to request a prediction from a shipping destination prediction system. In this example, the triggers 960 all involve receiving some data from a customer in a customer session. In some embodiments, other types of events may also be used as shipping destination prediction triggers. In some embodiments, any new data that may potentially impact the shipping destination prediction may trigger a shipping destination prediction request.

Operation 962 is one example type of trigger. At operation 962, a current location data for a customer of an item ordering service is received. In some embodiments, the current location data may be obtained via a module such as the customer location resolution module 140, as discussed in FIG. 1. Such a module may determine the customer location based on a detected IP address or GPS data associated with a customer device. In some embodiments, the customer location may be determined at the beginning of a customer session, for example, when a customer logs on to a website provided by the item ordering service.

Operation 964 is another example type of trigger. At operation 964, order data is received for an order of one or more items. In some embodiments, the order data may be received via a GUI of the item ordering service, for example the user interface 132 or GUI 640. In some embodiments, the order data may be incomplete, and gradually populated as the customer interacts with the GUI. In some embodiments, when a customer select item for a potential order, for example, by adding an item to an online shopping cart, the order may be initiated. Depending on the embodiment, additional order data may include other items, the number of items, any special terms or offers associated with the order, an indication whether the order is a gift, among other types of data that may be provided by the customer. In some embodiments, any additional order data received about the order may cause a request to make a new shipping destination prediction.

Operation 966 is yet another example type of trigger. At operation 966, a checkout data for a checkout is received via the GUI. In some embodiments, the checkout data may include data about finalizing the order, including payment information, delivery options, gift or packaging options, etc. In some embodiments, the checkout data may be received during a checkout process, which may occur after the customer clicks a "checkout" button on the GUI to finalize an order of all items in the online shopping cart. In some embodiments, the very act of initiating checkout, or any additional checkout data received during the checkout process, may cause a new shipping destination prediction.

At operation 970, in response to one of the triggers 960, a request is made for a shipping destination prediction from the ML shipping destination prediction model (e.g. model 170). The prediction may be made based on the received data associated with the trigger. In some embodiments, the received data may be provided to the ML shipping destination prediction system through an API, and the received data may be specified as input parameters. In some embodiments, the received data may simply be stored in a data store, and the shipping destination prediction system will access that data store to obtain the data. For example, in some embodiments, a customer's current shopping cart may be stored in a data store, along with an order ID. The request to the shipping destination prediction system may specify the order ID, which allows the shipping destination prediction system to retrieve the data associated with the customer's shopping cart.

As shown, after the shipping destination prediction request is made, the shipping destination prediction system may generate a predicted destination as the output. The output destination may then be used to perform a number of actions 980. In this example process, the actions all cause the GUI to be updated in some respect. However, in some embodiments, other actions may also be performed in response to a predicted shipping destination. For example, in some embodiments, the predicted shipping destination may cause one or more messages or alerts to be generated to a regional warehouse or a third-party vendor, to allow such other entities to take appropriate actions based on the predicted shipping destination.

Operation 982 is one example action that may be performed in response to a predicted shipping destination. At operation 982, the item ordering service causes its GUI to be updated to indicate the predicted shipping destination. In some embodiments, the predicted shipping destination may be displayed to the customer early in the customer's session, so that the customer can change the destination as early as possible. The correct shipping destination for the customer may provide a better targeted and more friendly user experience for the customer during the session. In some embodiments, the operation may be performed to auto-fill a form, for example, a GUI form to specify the shipping destination for the order.

Operation 984 is another example action that may be taken. At operation 984, the GUI is updated to indicate a location-specific offer based on the predicted shipping destination. In some embodiments, the offer may take advantage of a presumed shipping location, to identify other items that may be easily or cheaply piggybacked on the order. For example, for a delivery of groceries, the item ordering service may determine that other types of fresh groceries that the customer may be interested in are close to the customer's predicted shipping destination. The GUI may then be updated to present the other groceries as offers to the customer, to be added to the same order.

Operation 986 is another example action that may be taken. At operation 986, the GUI is updated to indicate one or more shipping options for the order based on the predicted shipping destination. In some embodiments, the shipping option may be presented in a list to be selected by the customer. In some embodiments, a shipping option may specify terms such as a shipping service provider, a shipping cost, and/or an estimated shipping time. In some embodiments, certain shipping options or offers of options are only available based on the shipping destination. According, the predicted shipping destination allows the item ordering service to determine the available shipping options for the customer. In some embodiments, the predicted shipping destination allows the item ordering service to determine the parameters of the shipping options, such as shipping cost or shipping time.

At operation 990, additional interaction data is received via the GUI about the prediction shipping destination, either approving or disapproving the predicted shipping destination. As a result of this additional interaction, the performance metrics of the prediction model is updated. For example, in some embodiments, the customer may correct a predicted shipping address via the GUI, to instead select a different address. Such a correction may indicate a disapproval of the predicted shipping destination. In some embodiments, the customer may accept the predicted shipping destination by completing the checkout process without changing the predicted shipping destination. As discussed, such additional interactions may indicate an accuracy of the prediction model. Accordingly, these interactions may be used to grade the model, for example using the model performance tracker component 530 in FIG. 5. The performance metrics of the model may be maintained for a period of time, to be used to either make adjustments to the model or generate performance reports for the model.

As may be appreciated by those skilled in the art, in some embodiments, the destinations selected by the prediction system and model discussed in the figure may include virtual locations for digital goods, instead of physical shipping locations. In some embodiments, these types of virtual locations may be specified by other types of addresses such as email addresses, social media account IDs, telephone numbers, network addresses of devices (e.g. a smart TV or computer, etc.). The destination prediction system as discussed herein may be used to select from these types of virtual locations as delivery destinations, without departing from the spirit of these disclosures. For example, in some embodiments, a delivery destination prediction system similar to the shipping destination prediction system 160 of FIG. 1 may be used to select from a number of different virtual or electronic addresses to predict the delivery destination of a digital good (e.g. a movie, a software, etc.).

FIG. 10 is a block diagram illustrating an example computer system that can be used to host one or more portions of a sequential decision system that automatically switches models based on model parameter confidence sets, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1026. The system memory 1020 may include different levels of cache, some of which may be located on the CPU and some away from the CPU. One level of the cache hierarchy may be a last level cache that is shared by all of the processors 1010a to 1010n. The last level cache may be an inclusive cache of the low levels of cache in the cache hierarchy. As shown, the code memory 1025 in this example may be used to store instructions for executing various components, such the shipping destination prediction system 160. As shown, the data memory 1026 may be used to store data used by various components discussed herein, such as portions of the destination prediction data 224 or other types of data.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 10, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 10 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:
   one or more computers with hardware processors and associated memory that implement a shipping destination prediction system to:
      receive, from an item ordering service, a request to predict a shipping destination for an order of one or more items associated with a customer account;
      obtain a plurality of different types of data to be used to predict the shipping destination, wherein the plurality of different types of data includes:
         (a) shipping records of past orders associated with the customer account that were shipped to respective shipping destinations,
         (b) profile data associated with the customer account, and
         (c) analytics data associated with the customer account determined based at least in part on interactions of the customer account with the item ordering service;
      generate, from the data, one or more types of engineered data to be used to predict the shipping destination;
      select, using a machine learned (ML) shipping destination prediction model and at least the engineered data as input data, a location class from a plurality of location classes, wherein individual ones of the location classes correspond to different types of location data fields in the data or the engineered data, and the ML shipping destination prediction model is trained to output the location class to indicate a selected location data field that contains a predicted shipping destination for the order; and
      return the predicted shipping destination for the order in the selected location data field, wherein the prediction shipping destination is to be presented via a user interface of item ordering service.

2. The system of claim 1, wherein the different types of location data fields for a given customer account include two or more of:
   a most frequently shipping address of the given customer account, wherein the most frequent shipping address is a most frequently used shipping address in (a) a fixed number of shipment records associated with the given customer account or (b) shipment records associated with the given customer account within a fixed time window;
   a last shipping address in a set of latest shipment records associated with the given customer account;
   a last billing address associated with the given customer account; and
   a customer address specified in an address book associated with the given customer account.

3. The system of claim 1, wherein the shipping destination prediction system is configured to:
   determine a current location of a customer associated with the customer account based one or more of an Internet Protocol (IP) address detected for the customer and a Global Positioning System (GPS) location detected for the customer; and
   include the current location of the customer in the input data to the ML shipping destination prediction model to select the location class.

4. The system of claim 1, further comprising one or more computers with hardware processors and associated memory that implement the item ordering service, wherein the item ordering service is configured to:
   receive, via a graphical user interface (GUI), interaction data from a customer indicating the order of the one or more items;
   generate, using the shipping destination prediction system, the predicted shipping destination for the order; and
   cause the GUI to be updated to indicate the predicted shipping destination for the order.

5. The system of claim 4, wherein the item ordering service is configured to:
   determine, based at least in a part on the predicted shipping destination, one or more location-specific recommendations for the customer; and
   causing the GUI to be updated to indicate the one or more location-specific recommendations.

6. A method, comprising:
   performing, by one or more computers with hardware processors and associated memory that implement a delivery destination prediction system:
      obtaining a plurality of different types of data to be used to predict a delivery destination for an order of one or more items associated with a customer account, wherein the plurality of different types of data includes:
         (a) delivery records of past orders associated with the customer account that were delivered to respective delivery destinations,
         (b) profile data associated with the customer account, and (c) analytics data associated with the customer account determined based at least in part on interactions of the customer account with an item ordering service;

generating, from the data, one or more types of engineered data to be used to predict the delivery destination;

selecting, using a machine learned (ML) delivery destination prediction model and at least the engineered data as input data, a location class from a plurality of location classes, wherein individual ones of the location classes correspond to different types of location data fields in the data or the engineered data, and the ML delivery destination prediction model is trained to output the location class to indicate a selected location data field that contains a predicted shipping destination for the order; and outputting the predicted delivery destination for the order in the selected location data field.

7. The method of claim 6, wherein the different types of location data fields for a given customer account include two or more of:

a most frequently delivery address of the given customer account, wherein the most frequent delivery address is a most frequently used delivery address in (a) a fixed number of delivery records associated with the given customer account or (b) delivery records associated with the given customer account within a fixed time window;

a last delivery address in a set of latest delivery records associated with the given customer account;

a last billing address associated with the given customer account; and a customer address specified in an address book associated with the given customer account.

8. The method of claim 6, wherein the delivery destination prediction system is implemented as part of a web browser configured to send delivery requests to the item ordering service.

9. The method of claim 6, further comprising performing, by delivery destination prediction system:

determining a current location of a customer associated with the customer account based one or more of an Internet Protocol (IP) address detected for the customer and a Global Positioning System (GPS) location detected for the customer; and including the current location of the customer in the input data to the ML delivery destination prediction model to select the location class.

10. The system of claim 6, wherein the input data to the ML delivery destination prediction model includes one or more of:

a gift indicator indicating whether order includes a gift item;

a delivery time for the order;

a number of past deliveries associated with the customer account;

a number of customer addresses in an address book associated with the customer account;

a number of payment instruments associated with the customer account;

one or more indications of interactions of the customer account with the item ordering service; and an indicator indicating whether the customer account is a seller of items.

11. The method of claim 6, wherein the delivery destination prediction system is a shipping destination prediction system and the predicted delivery destination is a shipping destination, and further comprising performing, by the item ordering service:

receiving, via a graphical user interface (GUI), interaction data from a customer indicating the order of the one or more items;

generating, using the shipping destination prediction system, the predicted shipping destination for the order; and causing the GUI to be updated to indicate the predicted shipping destination for the order.

12. The method of claim 11, wherein the order includes a first item and a second item, and the item ordering service is configured to:

associate the predicted shipping destination to the first item;

generate, using the shipping destination prediction system, another predicted shipping destination for the second item; and cause the GUI to be updated to indicate the predicted shipping destination for the first item and the other predicted shipping destination for the second item.

13. The method of claim 11, further comprising performing, by the item ordering service:

determining, based at least in a part on the predicted shipping destination, one or more shipping options for the shipment, wherein a shipping option includes a shipping time estimate; and causing the GUI to be updated to indicate the one or more shipping options and to receive a selection of one of the one or more shipping options from the customer.

14. The method of claim 11, wherein:

the ML delivery destination predication model is trained to generate a confidence metric for the location class selected; and further comprising causing, by the item ordering service, the GUI to be updated to include a confidence indicator of the predicted shipping destination based at least in part on the confidence metric.

15. The method of claim 11, further comprising performing, by the item ordering service:

receiving additional interaction data from the customer indicating either approving or disapproving the predicted shipping destination;

updating one or more performance metrics for the ML delivery destination prediction model based at least in part on the additional interaction data; and generating a performance report of the ML delivery destination prediction model indicating the one or more performance metrics.

16. The method of claim 11, wherein at least some of the engineered data is generated before a request to generate the predicted shipping destination for the order; and further comprising:

monitoring at least some of the plurality of different types of data for changes;

detecting a change in the plurality of different types of data based on the monitoring;

responsive to the detection, updating the engineered data based at least in part on the change.

17. The method of claim 6, wherein the predicted delivery destination includes one or more of an email address, a phone number, and a network address for a device.

18. One or more non-transitory computer-accessible storage media storing program instructions that when executed on or across one or more processors cause the one or more processors to implement a training system for a machine learning (ML) model to:
- obtain a plurality of different types of data to be used to train a ML delivery destination prediction model to predict delivery destinations for different orders associated with different customer accounts submitted to an item ordering service, wherein the plurality of different types of data includes:
  - (a) delivery records of past orders that were delivered to respective delivery destinations;
  - (b) profile data associated with the customer accounts, and
  - (c) analytics data associated with the customer accounts determined based at least in part on interactions of the customer accounts with the item ordering service;
- generate, from the data, one or more types of engineered data to be used to train the ML delivery destination prediction model;
- generate a training dataset for ML delivery destination prediction model, wherein the training dataset includes observation records that correspond to individual ones of the delivery records, and individual ones of the observation records include a combination of attributes in the data and the engineered data associated with respective delivery records; and
- label individual ones of the observation records with respective class labels, wherein individual ones of the class labels correspond to different types of location data fields in the data or the engineered data, so that an individual class label for an individual observation record indicates a type of location data field that contains the individual observation record's delivery destination; and using the training dataset and a machine learning technique, train the ML delivery destination prediction model to predict the respective class labels of the individual observation records, so that the respective class labels indicate respective location data fields in the data or the engineering data that contain respective delivery destinations of the individual observation records.

19. The one or more non-transitory computer-accessible storage media of claim 18, wherein the different types of location data fields for a given customer account include two or more of:
- a most frequently delivery address of the given customer account, wherein the most frequent delivery address is a most frequently used delivery address in (a) a fixed number of delivery records associated with the given customer account or (b) delivery records associated with the given customer account within a fixed time window;
- a last delivery address in a set of latest delivery records associated with the given customer account;
- a last billing address associated with the given customer account; and
- a customer address specified in an address book associated with the given customer account.

20. The one or more non-transitory computer-accessible storage media of claim 18, wherein to generate the engineered data, the program instructions when executed on the one or more processors cause the training system to:
- generate one or more indicators indicating whether two or more of the different types of location data fields have a common location value.

* * * * *